US009236751B2

United States Patent
Goei et al.

(10) Patent No.: US 9,236,751 B2
(45) Date of Patent: Jan. 12, 2016

(54) PORTABLE MODULAR SUN-TRACKING SOLAR ENERGY RECEIVER SYSTEM

(71) Applicant: ASPECT SOLAR PTE LTD, Singapore (SG)

(72) Inventors: Esmond T. Goei, Broomfield, CO (US); Andrew E. Goei, Broomfield, CO (US); Mok Tiong Tan, Singapore (SG); Haryadi Marnyo, Singapore (SG); Li Lei, Singapore (SG); Ryan Flores Mejia, Singapore (SG); Yen Chin, Singapore (SG)

(73) Assignee: ASPECT SOLAR PTE LTD, Singapore (SG)

( * ) Notice: Subject to any disclaimer, the term of this patent is extended or adjusted under 35 U.S.C. 154(b) by 288 days.

(21) Appl. No.: 13/790,749

(22) Filed: Mar. 8, 2013

(65) Prior Publication Data

US 2013/0234645 A1     Sep. 12, 2013

Related U.S. Application Data

(60) Provisional application No. 61/608,695, filed on Mar. 9, 2012, provisional application No. 61/676,529, filed on Jul. 27, 2012, provisional application No. 61/696,831, filed on Sep. 5, 2012, provisional application No. 61/746,211, filed on Dec. 27, 2012, provisional application No. 61/747,606, filed on Dec. 31, 2012.

(51) Int. Cl.
*H02J 7/00*     (2006.01)
*H02J 7/35*     (2006.01)
(Continued)

(52) U.S. Cl.
CPC .............. *H02J 7/0052* (2013.01); *H02J 7/355* (2013.01); *H02S 20/00* (2013.01); *H02S 30/20* (2014.12); *Y02E 10/50* (2013.01); *Y10T 307/50* (2015.04)

(58) Field of Classification Search
CPC ................................. H02J 7/0052; H02J 7/00
USPC ........................................................ 320/101
See application file for complete search history.

(56) References Cited

U.S. PATENT DOCUMENTS 4,169,738 A * 10/1979 Luque .......................... 136/246
4,540,843 A * 9/1985 Gochermann et al. ........ 136/251
(Continued)

FOREIGN PATENT DOCUMENTS

WO     2009105291 A1     8/2009
WO     2011123156 A1     10/2011

OTHER PUBLICATIONS

Texas Instruments, Energy Harvesting: Solar, http://www.ti.com/lit/sl/slyy027/slyy027.pdf, published on Jan. 10, 2011, http://www.ti.com/solution/solar_power_inverters.*

(Continued)

*Primary Examiner* — Richard Isla Rodas
*Assistant Examiner* — Dung V Bui
(74) *Attorney, Agent, or Firm* — Howison & Arnott, LLP

(57) ABSTRACT

A portable solar energy generation system has a solar energy receiver having a plurality of solar cells for converting solar energy into a DC voltage. A solar tracking mechanism enables the solar energy receiver to track a position of the sun with respect to the solar cells and to position the solar cells responsive thereto. Power circuitry generates at least one output voltage to power an electronic device responsive to the DC voltage. A housing contains each of the solar energy receiver, the solar tracking mechanism and the power circuitry in a portable configuration.

27 Claims, 24 Drawing Sheets

(51) Int. Cl.
*H01L 31/042* (2014.01)
*H02S 30/20* (2014.01)

(56) References Cited

U.S. PATENT DOCUMENTS

| | | | | |
|---|---|---|---|---|
| 8,466,399 | B1* | 6/2013 | Sherman | 250/203.4 |
| 2007/0188130 | A1* | 8/2007 | Scheucher | 320/110 |
| 2009/0288698 | A1* | 11/2009 | Chen | 136/244 |
| 2010/0102202 | A1* | 4/2010 | Sherman | 250/203.4 |
| 2010/0207571 | A1 | 8/2010 | English et al. | |
| 2011/0084647 | A1 | 4/2011 | Haines | |
| 2011/0273130 | A1 | 11/2011 | Lee et al. | |
| 2012/0004780 | A1* | 1/2012 | Miller et al. | 700/286 |
| 2012/0193512 | A1* | 8/2012 | Wu et al. | 250/203.4 |
| 2012/0206087 | A1* | 8/2012 | Carpoff | 320/101 |
| 2013/0169038 | A1* | 7/2013 | King | 307/10.1 |
| 2013/0186120 | A1* | 7/2013 | Lee et al. | 62/235.1 |
| 2013/0234645 | A1* | 9/2013 | Goei et al. | 320/101 |

OTHER PUBLICATIONS

Texas Instruments, Energy Harvesting: Solar, http://www.ti.com/lit/sl/slyy027/slyy027.pdf, published on Jan. 10, 2011.*
PCT: International Preliminary Report on Patentability for PCT/IB2013/000917 (related application), Sep. 18, 2014, 6 pgs.
PCT: International Search Report and Written Opinion of PCT/IB2013/000914 (related application), Oct. 23, 2013, 9 pgs.

* cited by examiner

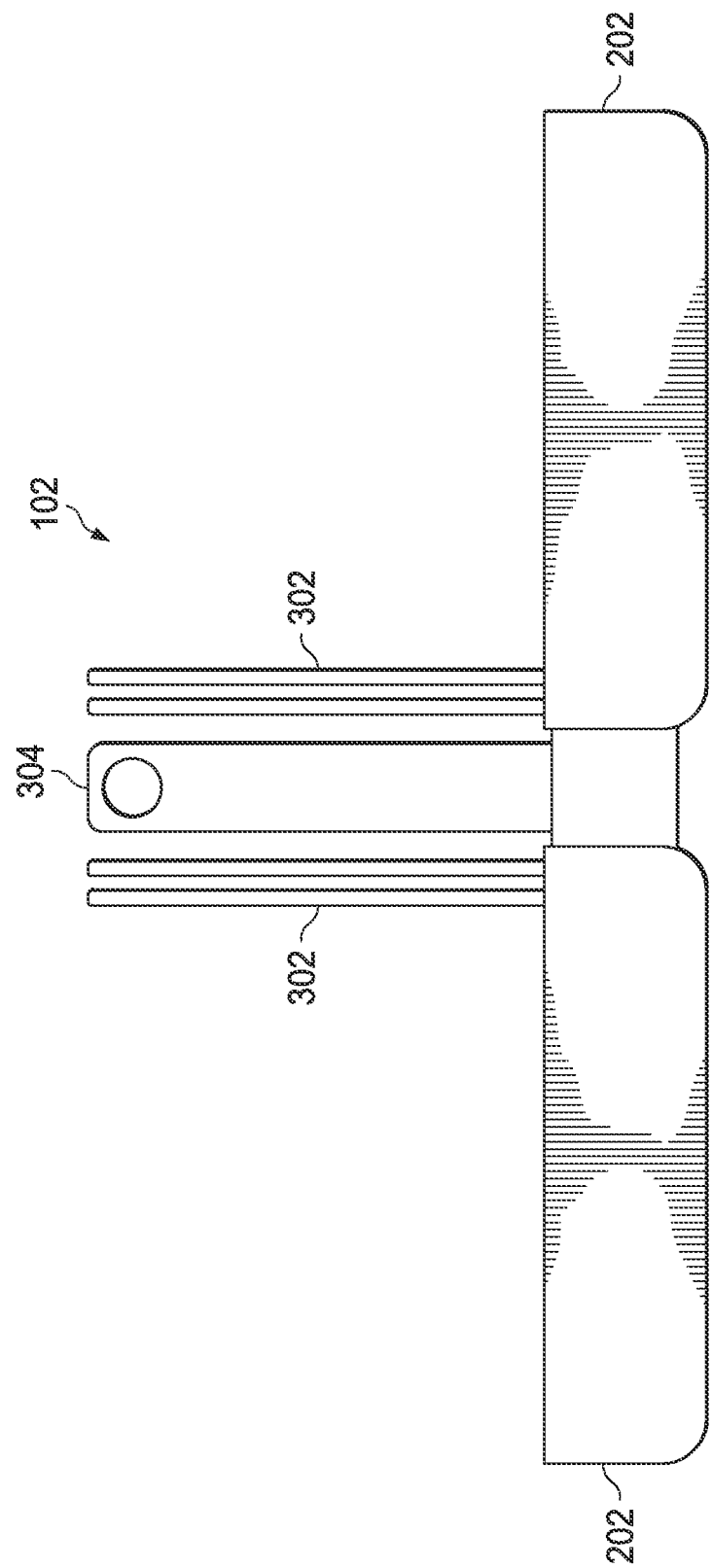

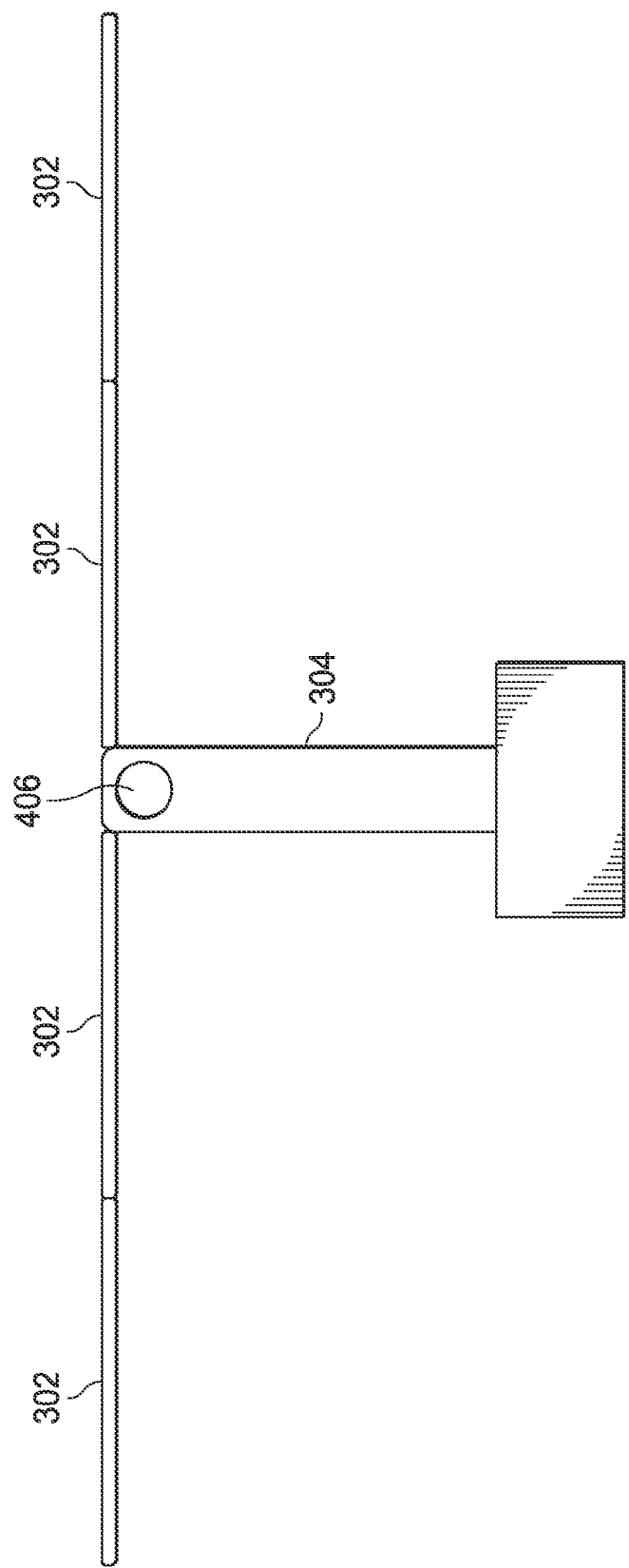

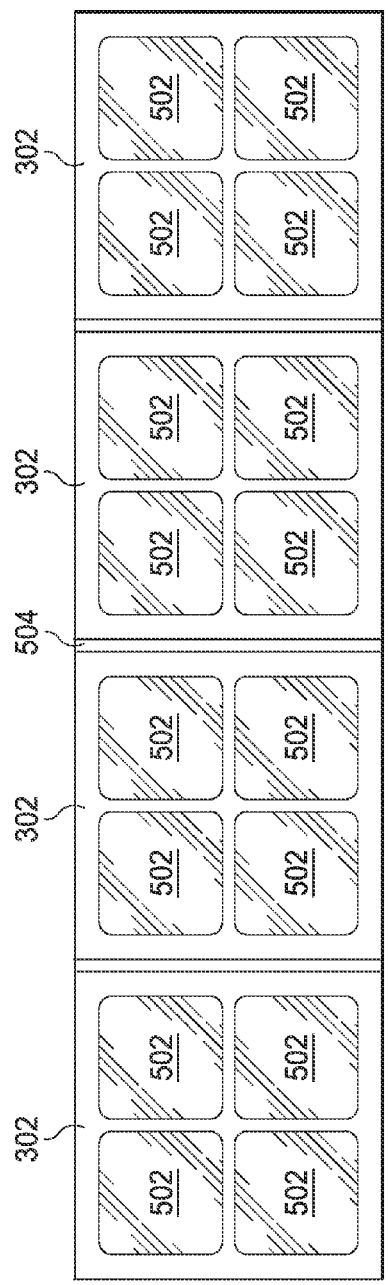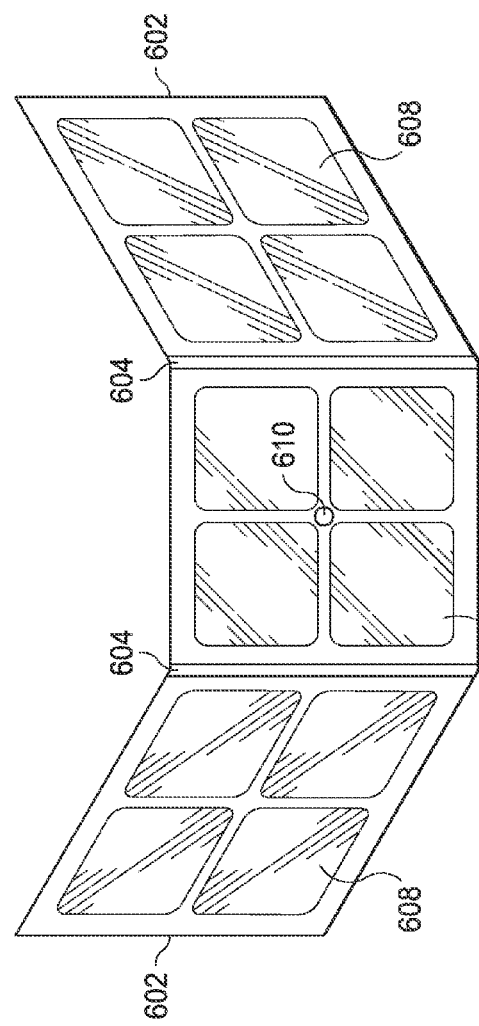
FIG. 5
FIG. 6

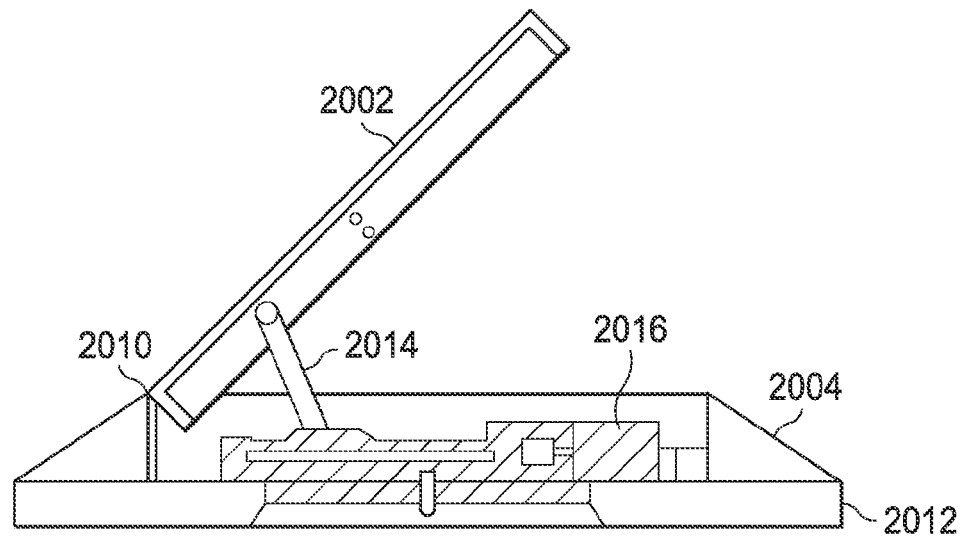
FIG. 21
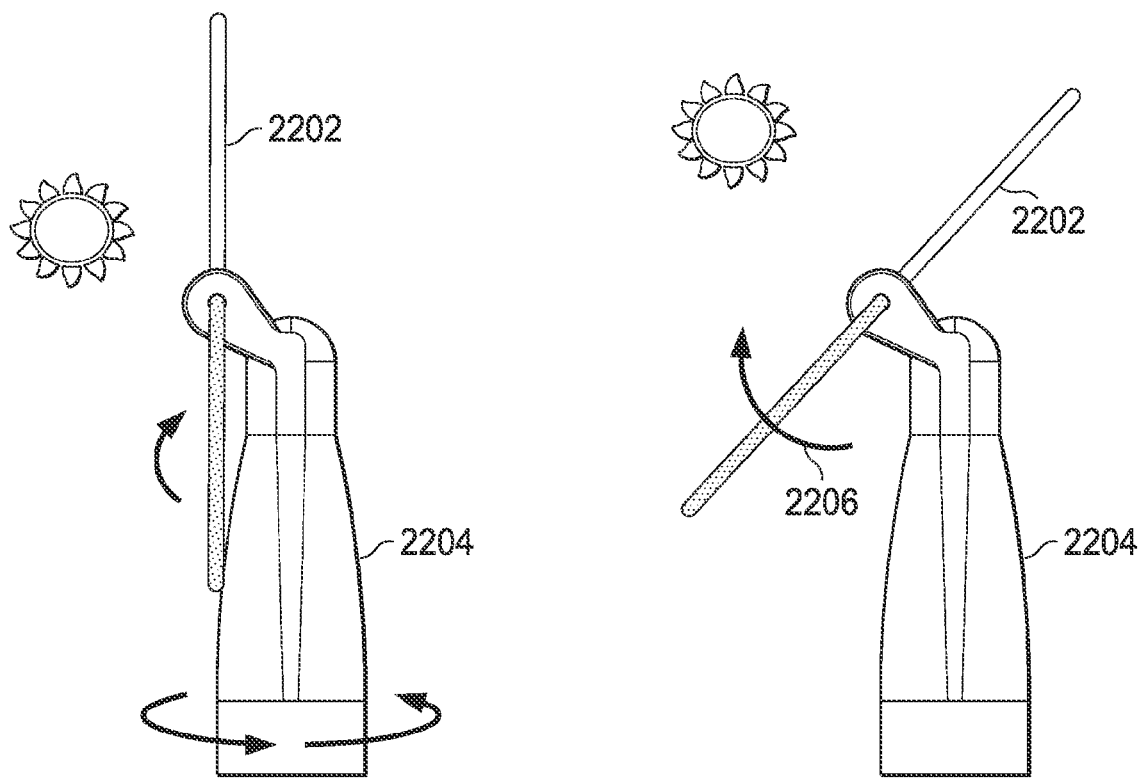
FIG. 22a
FIG. 22b

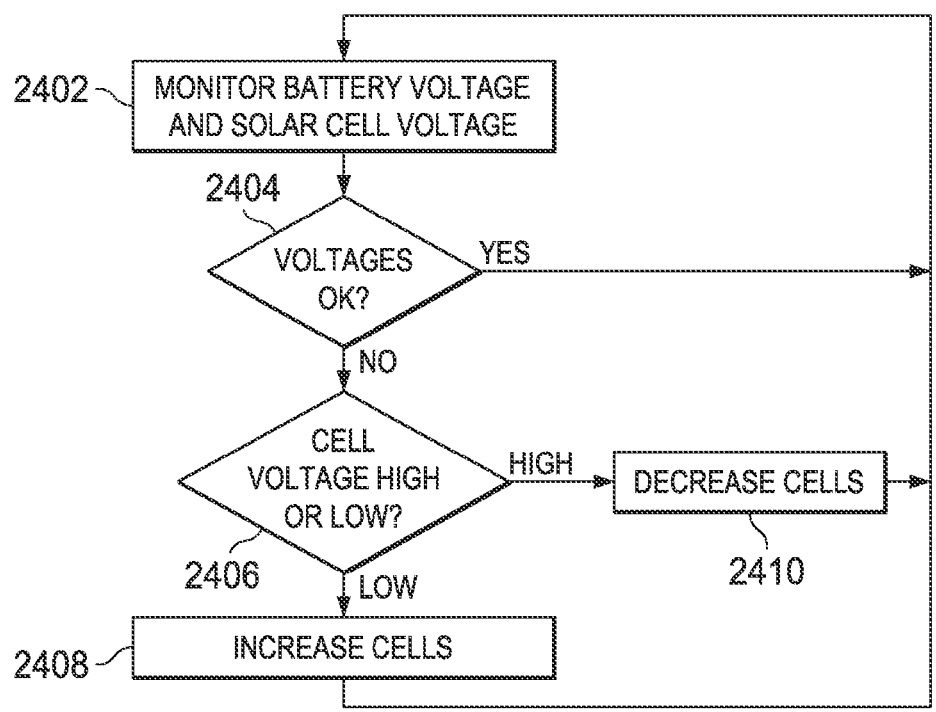
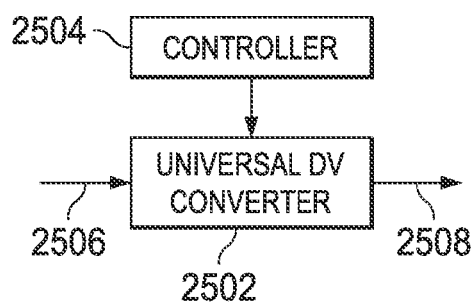
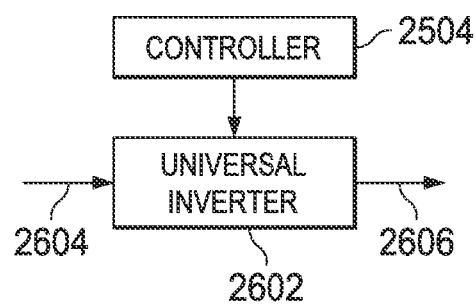

PORTABLE MODULAR SUN-TRACKING SOLAR ENERGY RECEIVER SYSTEM

CROSS-REFERENCE TO RELATED APPLICATIONS

This application claims benefit of U.S. Provisional Application No. 61/608,695, filed Mar. 9, 2012, entitled PORTABLE MODULAR SUN-TRACKING SOLAR ENERGY RECEIVER SYSTEM, U.S. Provisional Application No. 61/676,529. filed Jul. 27, 2012, entitled MODULAR SOLAR TRACKING APPARATUS, U.S. Provisional Application 61/696,831, filed Sep. 5, 2012, entitled MULTIPLE PURPOSE SUN-TRACKING SOLAR ENERGY RECEIVERS, U.S. Provisional Application No. 61/746,211, filed Dec. 27, 2012, entitled METHOD FOR DEPLOYING AND RETRACTING OF SOLAR-TRACKING PV SOLAR CELLS FOR PORTABLE AND MODULAR SOLAR POWERED ELECTRICITY GENERATORS, and U.S. Provisional Application No. 61/747,606, filed Dec. 31, 2012, entitled MODULAR SOLAR ENERGY SYSTEM ARCHITECTURE, the specifications of which are incorporated herein in their entirety.

TECHNICAL FIELD

The present invention relates to solar energy receiver systems, and more particularly, to a portable solar energy receiving system capable of tracking the sun and storing energy generated by the system.

BACKGROUND

Since the advent of portable radios, the variety and quantity of battery operated portable electronic devices have grown unabatedly. The introduction of mobile telephones and personal organizers having powerful computing capacity, numerous software applications and internet access have increased the widespread use of portable electronic devices. Increasing functionalities and applications such as games and online social networking enabled by high speed wireless internet access results in greater device usage by individuals causing the devices to become fixtures within individual's lifestyles. Increased usage results in faster depletion of a devices battery power.

Portable devices such as mobile telephones, tablets etc. are exemplary of a growing market segment commonly referred to as "lifestyle electronics" and such devices consume electricity that is provided via rechargeable built in or removable batteries. The problem is that such devices are by design intended to be portable and compact in size and are thus limited in the size and storage capacity of their batteries. Additionally, users do not want to carry multiple batteries for each device that they are using and it is not uncommon to find a user carrying multiple devices at all times. This provides a need for portable solar electricity generators to be used by users that do not wish to burden themselves with carrying multiple, heavy back up batteries. Additionally, these portable solar electricity generators provide users with the ability to not be tethered to fixed electrical AC or DC outlets.

Numerous manufacturers have introduced portable battery back up systems for use in charging electronic devices either by providing additional batteries that supplement the electronic device battery or will charge the electronic device battery itself. Typically, batteries need to be charged via an AC electrical outlet as its electrical charge is depleted and some manufacturers have provided battery chargers that derive their energy from the sun via flat photovoltaic panels. Such systems employ various photovoltaic (PV) panels that are interconnected and foldable into compact packages but require user assembly to interconnect the battery charger/battery to the photovoltaic panels and the battery to the AC inverter. This is a cumbersome arrangement that requires a user to be knowledgeable and dexterous. Additionally, these photovoltaic panels typically do not deliver the rated power advertised by the manufacturer because the photovoltaic panels are stationery whereas the sunlight shifts throughout the day. Hence, there is a need for solar energy systems that utilizes a sun tracking mechanism in conjunction with the photovoltaic panels. More importantly, in order to be of utility to users traveling with multiple personal lifestyle devices such sun tracking solar energy receivers must provide ample power for their multiple devices. Thus, there is a need for a device capable of generating sufficient power to power such devices directly from the sun or subsequently from built in batteries when the sun is no longer available. Currently available portable photovoltaic panel based solar chargers do not have the ability to generate sufficient power to provide real time power to user devices.

SUMMARY

The present invention as disclosed and described herein, in one aspect thereof, comprises a portable solar energy generation system. A solar energy receiver has a plurality of solar cells for converting solar energy into a DC voltage. A solar tracking mechanism enables the solar energy receiver to track a position of the sun with respect to the solar cells and to position the solar cells responsive thereto. Power circuitry generates at least one output voltage to power an electronic device responsive to the DC voltage. A housing contains each of the solar energy receiver, the solar tracking mechanism and the power circuitry in a portable configuration.

BRIEF DESCRIPTION OF THE DRAWINGS

For a more complete understanding, reference is now made to the following description taken in conjunction with the accompanying Drawings in which:

FIG. 3 illustrates a solar energy collector assembly in a deployed configuration;

FIG. 4a-4c illustrates a deployment of the solar energy collector assembly;

FIG. 5 illustrates a illustrates a top surface of a photovoltaic panel;

FIG. 6 illustrates an embodiment of a folding panel assembly;

FIG. 17d illustrates an electrical connector of the embodiment of FIG. 17a;

FIG. 21 illustrates a side view of the embodiment of FIG. 20.

FIGS. 22a-22f illustrate a side view of the embodiment of FIG. 20;

FIG. 22 illustrates a tracking scenario for solar panels;

FIG. 24 illustrates a flow diagram for controlling charging of a battery;

FIG. 25 illustrates a universal DC/DC voltage converter;

FIG. 26 illustrates a universal DC/AC inverter;

DETAILED DESCRIPTION

Figure 1:
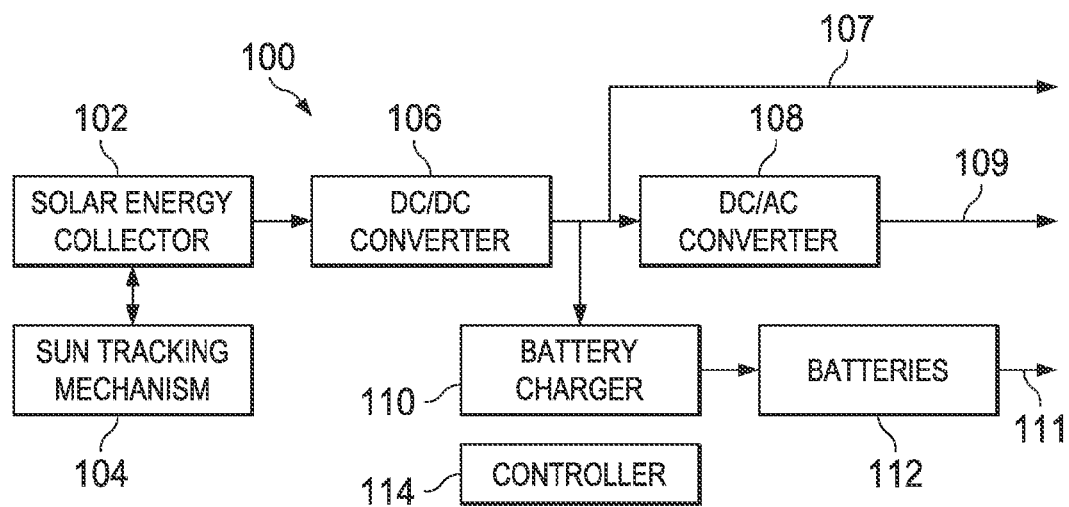
FIG. 1 illustrates a block diagram of a solar energy receiver system.

Referring now to the drawings, wherein like reference numbers are used herein to designate like elements throughout, the various views and embodiments of a modular solar energy system architecture are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a block diagram of a sun tracking solar energy receiver system according to the present disclosure. The system provides electrical power for portable electronic devices without draining a built in battery enabling the system to be utilized for powering a device when the sun is no longer available. The compact portable sun tracking solar energy receiver 100 comprises several components including a solar energy collector 102, solar tracking mechanism 104, DC to DC converter 106, AC to DC converter 108, battery charger 110, built in batteries 112, and a system controller 114. The solar energy collector 102 is responsible for collecting the solar energy from the sun and converting the solar energy into a direct current (DC) voltage. The solar energy collector 102 may comprise one or more photovoltaic (PV) cells or a concentrator photovoltaic (CPV) cell for performing this functionality.

The sun tracking mechanism 104 is responsible for controlling the direction in which the photovoltaic or concentrator photovoltaic cells are facing in order to gather the sun's energy. Precise tracking of the sun is needed for a CPV system in order to orient the optics such that the incoming sunlight is continually focused onto the solar cells throughout the day. In typical CPV systems, the required tracking accuracy is at least plus or minus 0.1 degrees in order to deliver the rated power output of the CPV cell. To achieve such a precise tracking accuracy, an effective, power efficient and reliable solar tracking algorithm is crucial. Systems providing the type of high precision sun tracking mechanism are described in Co-pending U.S. Pat. No. 6,818,818 issued Nov. 16, 2004 and U.S. patent application Ser. No. 13/006,225 filed Jan. 13, 2011. Each of which are incorporated herein by reference in their entirety.

In as much as sun tracking is required for CPV solar energy receivers, sun tracking is additionally required for conventional photovoltaic (PV) panel systems in order to achieve maximum energy conversion efficiency throughout the entire day from sunrise to sunset. A photovoltaic panel will only achieve maximum efficiency when faced directly at the sun causing the rays to be perpendicular to the photovoltaic panel surface. Solar tracking mechanism 104 eliminates the need for user intervention to manually move and orient the solar panels to face directly at the sun. As will be more fully described herein below, the structure supporting the solar energy collector 102 and the solar tracking mechanism 104 must firmly support the cells in the same plane in order to insure that all cells are facing the sun at the same angle, ideally, perpendicular to the sun's rays.

The energy generated by the solar energy collector 102 is first provided to a DC to DC converter 106 that converts the DC energy generated by the solar energy collector 102 to a desired DC voltage level. The output of the DC to DC converter 106 may be provided either to a DC to AC converter 108 or to an output 107 as a charging DC voltage to a battery charger 110. The regulated DC voltage provided to the DC to AC converter 108 is used for conversion to a desired AC voltage within the DC to AC converter 108. This enables the DC to AC converter 108 to provide at an output 109, a regulated alternating current voltage that may be utilized by a system user as a charging voltage. The voltage provided by the DC to DC converter 106 to the battery charger 110 is used by the battery charger 110 to generate a charging voltage to the system battery 112. The system battery 112 will store an electrical charge that may be used as an output 111 for providing an operating voltage to various connected portable electronic devices.

A controller 114 is responsible for controlling the operation of all the components of the system. The controller 114 provides control signals to the solar tracking mechanism 104 for causing the solar energy collector 102 to track the movement of the sun throughout the day. The DC to DC converter 106 receives control signals from the controller 114 to control the regulated DC voltage that is provided from the output. Similarly, the controller 114 provides control signals to the DC to AC converter 108 to control the AC voltage generated at the output of the DC to AC converter 108. The controller 114 may also monitor the battery charger voltage and battery voltage in order to control the charging of the associated battery 112 to desired voltage levels without doing damage to either the battery 112 or the battery charging circuitry 110.

The solar tracking mechanism 104 orients the solar cells of the solar energy converter 102 towards the sun in a continuous manner such that the surfaces of the cells are always substantially perpendicular to the sun's rays. This continuous positioning is facilitated if the weight distribution of the cell assembly within the solar energy collector 102 is balanced such that the center of gravity (CG) does not shift as the assembly is being positioned. Thus, in a preferred embodiment the center of gravity of the solar energy collector 102 may be used as the pivot point of a drive mechanism that is controlling the positioning of the cells by utilizing the center of gravity as the pivot point for the drive mechanism. The positioning motors need not be overly stressed during operation of the system as a consequence of an unbalanced weight load placing undue stresses on the motors that positions the solar cells. Using the center of gravity as a pivot point eliminates or reduces the need for counterweights and increases the accuracy of the tracking system while increasing the life of the positioning mechanism implemented within the sun tracking mechanism 104.

Further with respect to the solar tracking mechanism 104 while the solar tracking algorithm for a CPV application must be extremely accurate, the algorithm for conventional photovoltaic cells need just point the solar cells in a general direction of the sun. This means that this type of system can be deployed on a moving platform such as an automobile, truck, train, ship, boat, bicycle, etc. This is the case because even during movement, as long as a photovoltaic panel can generally find the direction of the sun, the power efficiency of the system will remain quite high. Thus, with a tracking photovoltaic arrangement as described herein below, the travel range of an electric motorized device is greatly expanded and only limited by the availability of sunlight and the size of the storage battery.

The battery charger 110 should generate sufficient energy from the solar energy in order to provide enough energy to charge up the battery 112 to a fully charged level while still providing as an output sufficient energy to power a connected electronic device. This enables the connected electronic devices to be powered without draining the batteries 112. This prevents the system from acting as essentially a battery back up that only delays the period of time necessary to drain the batteries within a system rather than providing sufficient power to power the electronic devices while further charging the associated batteries 112 for future use. The use of the tracking mechanism 104 within the described system enables the generation of sufficient electricity for performing each of these functions.

The batteries 112 are used for the storage of energy created by either the concentrated photovoltaic or photovoltaic solar receivers and energy created by the battery charger 110. By storing energy within batteries 112 the stored energy may be provided for later use in situations when sunlight is not available. The batteries 112 are used for the storage of energy created by either the concentrated photovoltaic or photovoltaic solar receivers. By storing energy within batteries 112 the stored energy may be provided for later use in situations when sunlight is not available. Various different kinds of batteries 112 may be used within this system. These include lithium ion polymer batteries, lithium iron phosphate batteries, and lead acid batteries. Lithium ion polymer batteries (LiPo) comprise generally smaller batteries with higher efficiency and less weight. This type of battery is most commonly used in small electronic devices such as cell phones and laptops. LiPo batteries also are more expensive and have a shorter life span of around 400 cycles. Lithium iron phosphate (LiFePO4) batteries are low cost and can be recharged over 1,000 times. It is a slightly heavier battery that is larger in size in comparison with lithium ion polymer batteries but has over double the lifespan. This type of battery has the longest lifespan compared to others that are currently used in the solar industry. Lead acid batteries are the cheapest battery on the market but have extremely low energy to weight in energy to weight ratios. Most energy storage devices for solar products currently available use this type of lead acid battery.

Figure 2:
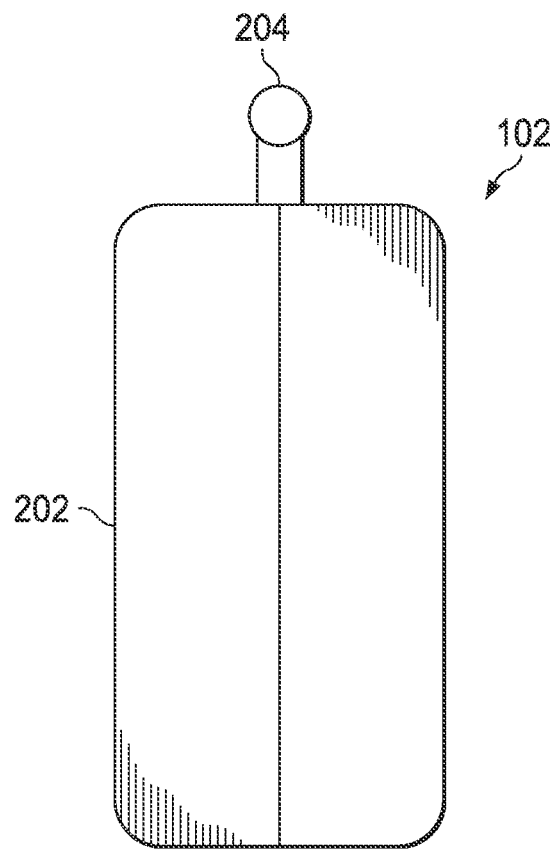
FIG. 2 illustrates a solar energy collector assembly.

Referring now to FIGS. 2 and 3, there's more particularly illustrated a first embodiment for packaging of a compact portable solar receiver according to the present disclosure. FIG. 2 illustrates the solar energy collector assembly 102 enclosed within a case 202 made from a lightweight structural material and including a handle 204 for easy carrying and movement. In order to provide a large amount of power on to a small platform, the solar receiver must be compact and lightweight so as not to appreciably increase the weight of the overall system. Compactness is also desired for ease of portability of the device. The case 202 and structure of the solar receiver 102 may be constructed of any number of lightweight materials such as plastics, composite, or aluminum which are all lightweight and strong.

Compactness for transportation or portability can also be facilitated by various methodologies in packing the photovoltaic cells or photovoltaic cell modules such as folding one photovoltaic module over another in such a matter that the modules are stacked within the compact volume of the carrying case 202. An example of this is illustrated in FIG. 3 which shows the case 202 opened and a number of folded photovoltaic modules 302 mounted to a central tracking arm 304. As can be seen, the photovoltaic modules 302 are folded compactly against the tracking arm 304 such that the entire structure fits completely within the carrying case 202. Once the case is opened the solar module 302 may be unfolded in the manner illustrated in FIGS. 4a through 4c.

Figure 4A:
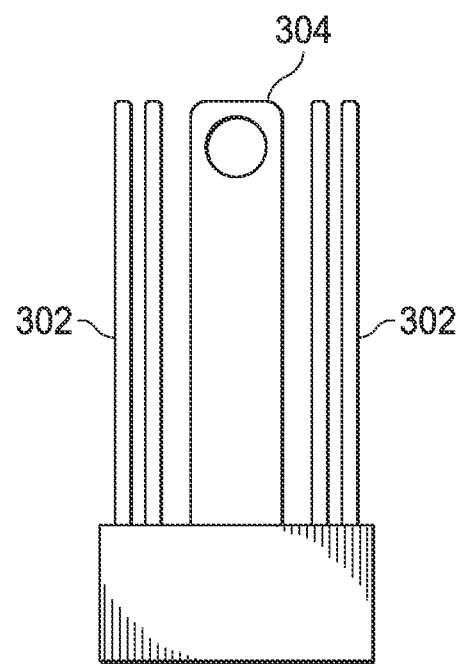
Figure 4B:
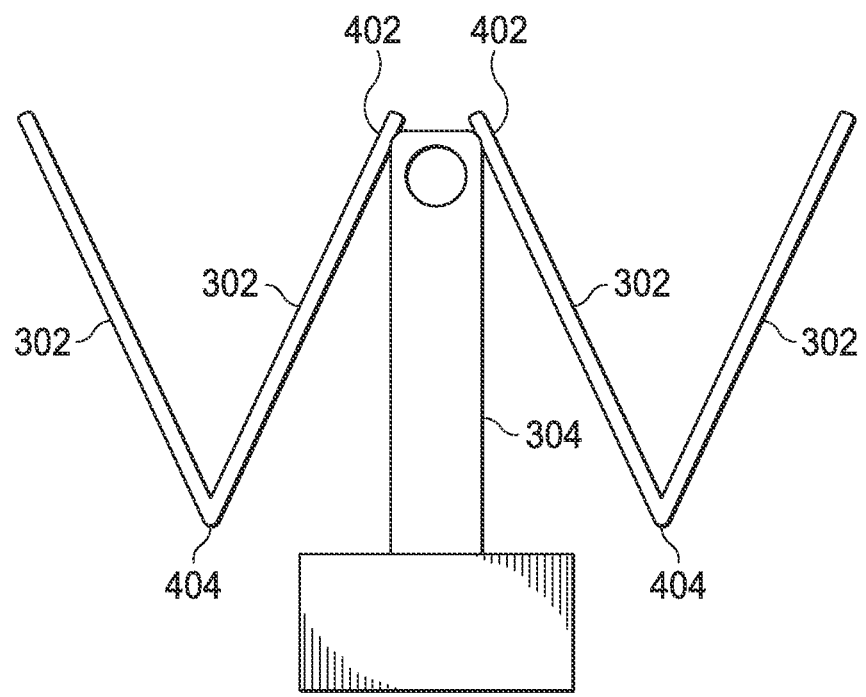

FIG. 4a illustrates the completely folded configuration wherein each of the photovoltaic modules 302 are completely folded against a central tracking arm 304. Next, as illustrated in FIG. 4-b, the photovoltaic module 302 begins to unfold and extend outward from the tracking arm 306. A first pair of solar panels 302 have a first end 402 connected to the tracking arm 304. A second end of the pair of photovoltaic module 302 is connected at a hinged point 404 with a second photovoltaic module 302. This enables the photovoltaic modules 302 to be folded and extended in an accordion fashion from the tracking arm 304. Finally, as illustrated in FIG. 4-c, there is illustrated the configuration of the photovoltaic module 302 in a fully extended configuration. The panels connect to the tracking arm 304 and the tracking arm 304 may rotate the extended photovoltaic module 302 in a 360 degree arc around the central axis of the tracking arm 304. Additionally, the angle of the photovoltaic module 302 may be changed with respect to that of the central axis of the tracking arm 304 about a pivot point 406.

FIG. 5 illustrates the top surface of the photovoltaic modules 302 in the extended position. As can be seen, each of the photovoltaic modules 302 include four photovoltaic solar cells 502 on the surface thereof. As discussed previously, the entire panel assembly will rotate and tilt about the center of gravity point 504 of the device to place less operational stresses upon the driving motors of the solar receiver assembly.

Figure 7:
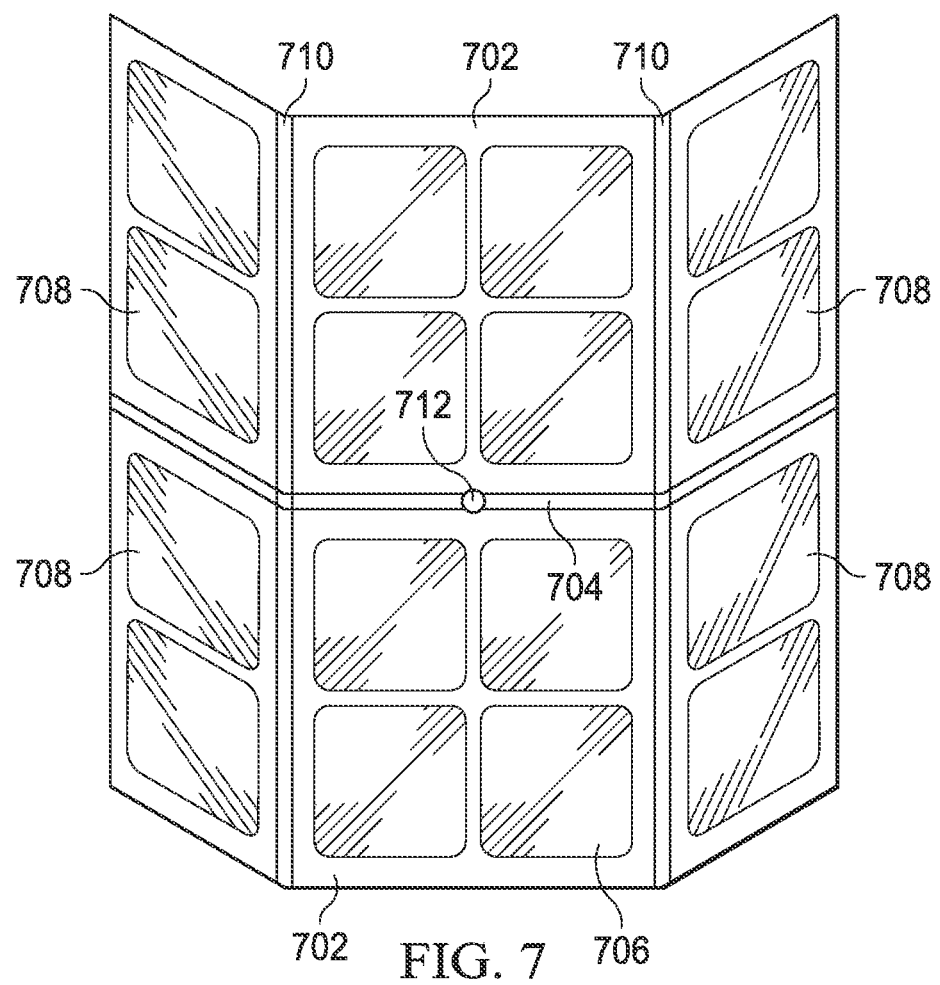
FIG. 7 illustrates a further embodiment of a folding panel assembly.
Figure 8:
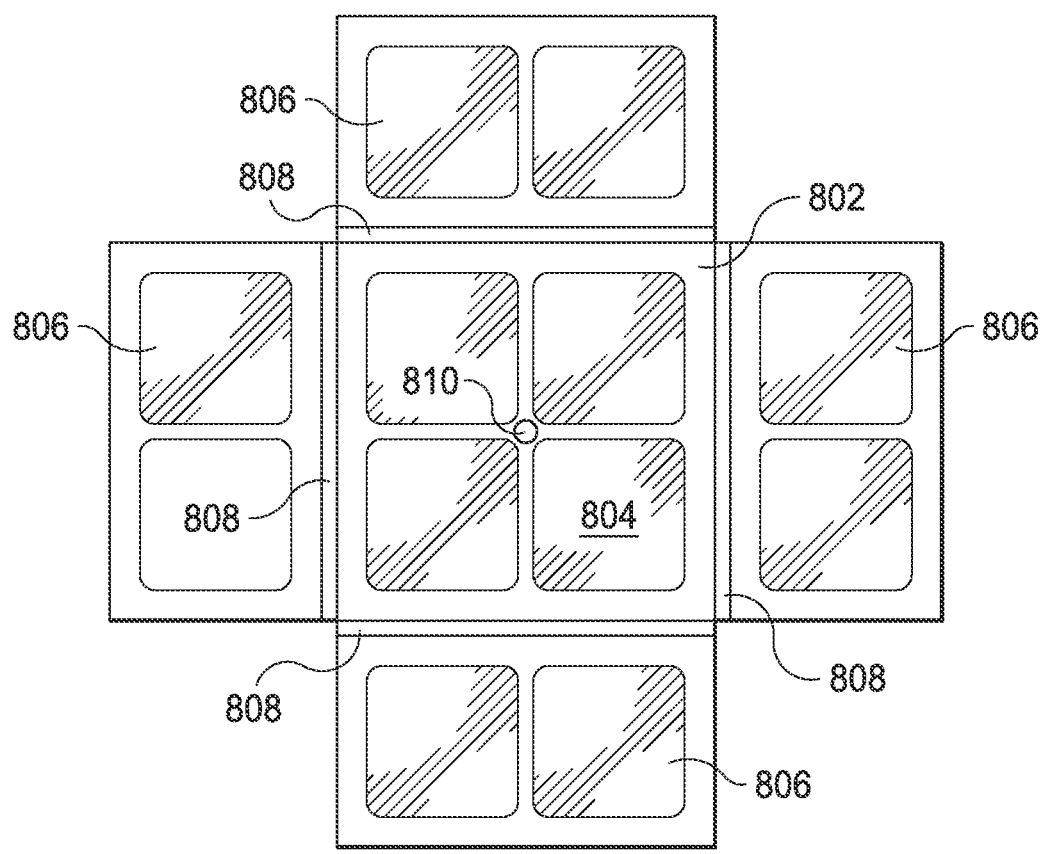
FIG. 8 illustrates yet another embodiment of a folding panel assembly.

Referring now to FIG. 6 through FIG. 8, there are illustrated further folding methodologies which may be used for configuring the photovoltaic module 302 in a small enough configuration to fit within the carrying case 202. These additional configurations provide additional power due to the greater number of photovoltaic cells 502 utilized within the various configurations. The configuration of FIG. 6 illustrates a three module assembly wherein wing modules 602 folds along connection lines 604 over a central module 606. The modules 602 and 606 each consist of a two by two array of solar cells 608. The center of gravity is at point 610. Additional configurations may embody different solar cell arrays.

The configuration of FIG. 7 illustrates a pair of modules 702 foldably connected along a line 704. Each of the modules 702 consist of a two by two array of solar cells 706. Connected along each edge of the modules 702 are a set of four modules 708 consisting of a one by two array of solar cells 706. Each of the modules 708 folds over the face of the center module 702 along a folding line 710. The panels 702 are then folded over each other to provide a single folded square configuration. The center of gravity of this configuration is at point 712.

Finally, as illustrated in FIG. 8, a central module 802 comprises a two by two array of solar cells 804. Along each edge of the central module 802 are a further group of modules 806 consisting of a one by two array of solar cells 804. Each of the side connected modules 806 fold along the line 808 onto the face of the central module 804. In the folded configuration, opposite modules 806 are first folded onto the face of the central module 804 and the other pair of opposite modules 806 from the adjacent sides are folded onto the face of the central module 804. The center of gravity 810 of this configuration is located at point 810.

Figure 9:
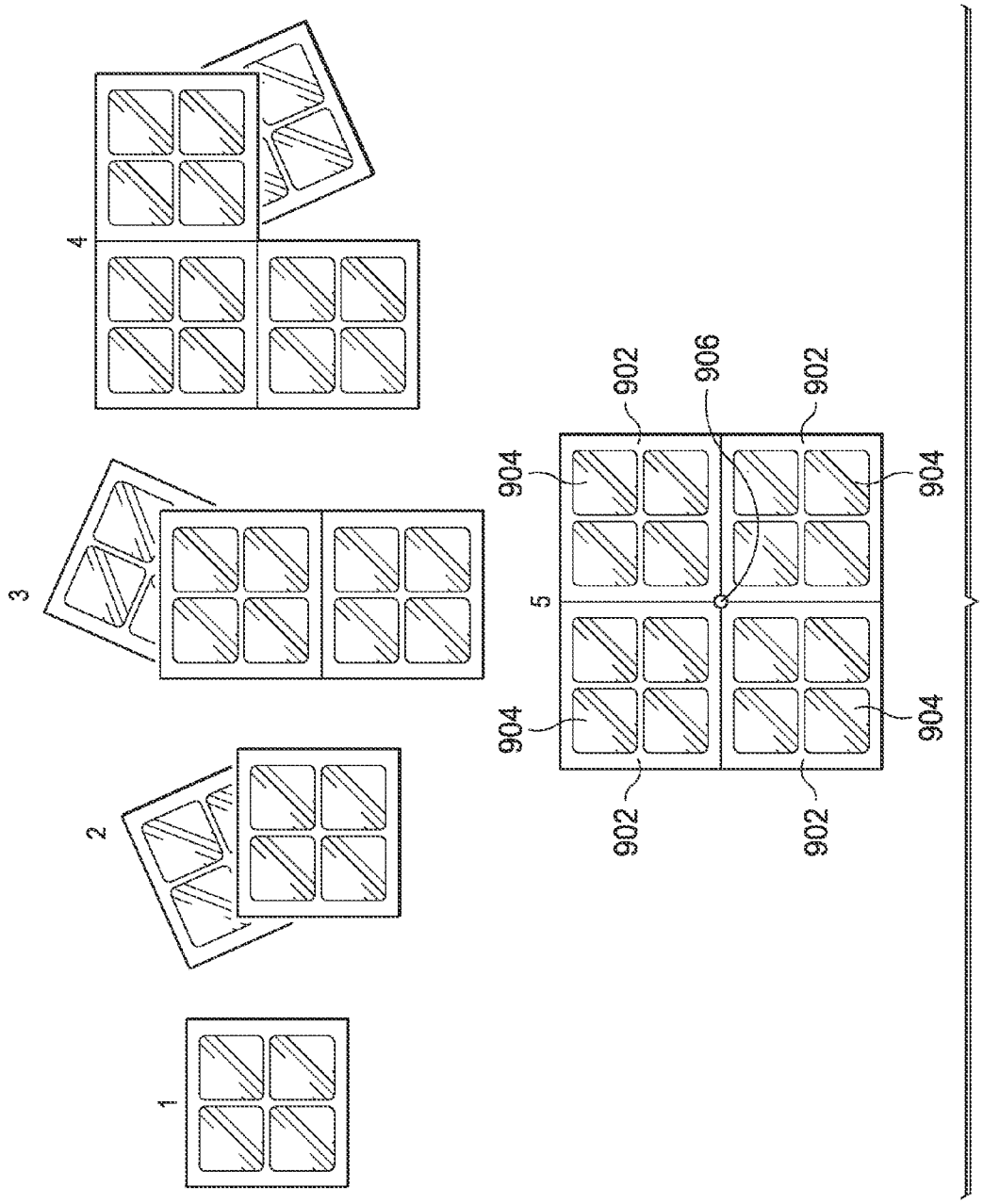
FIG. 9 illustrates a further embodiment of a folding panel assembly.
Figure 10:
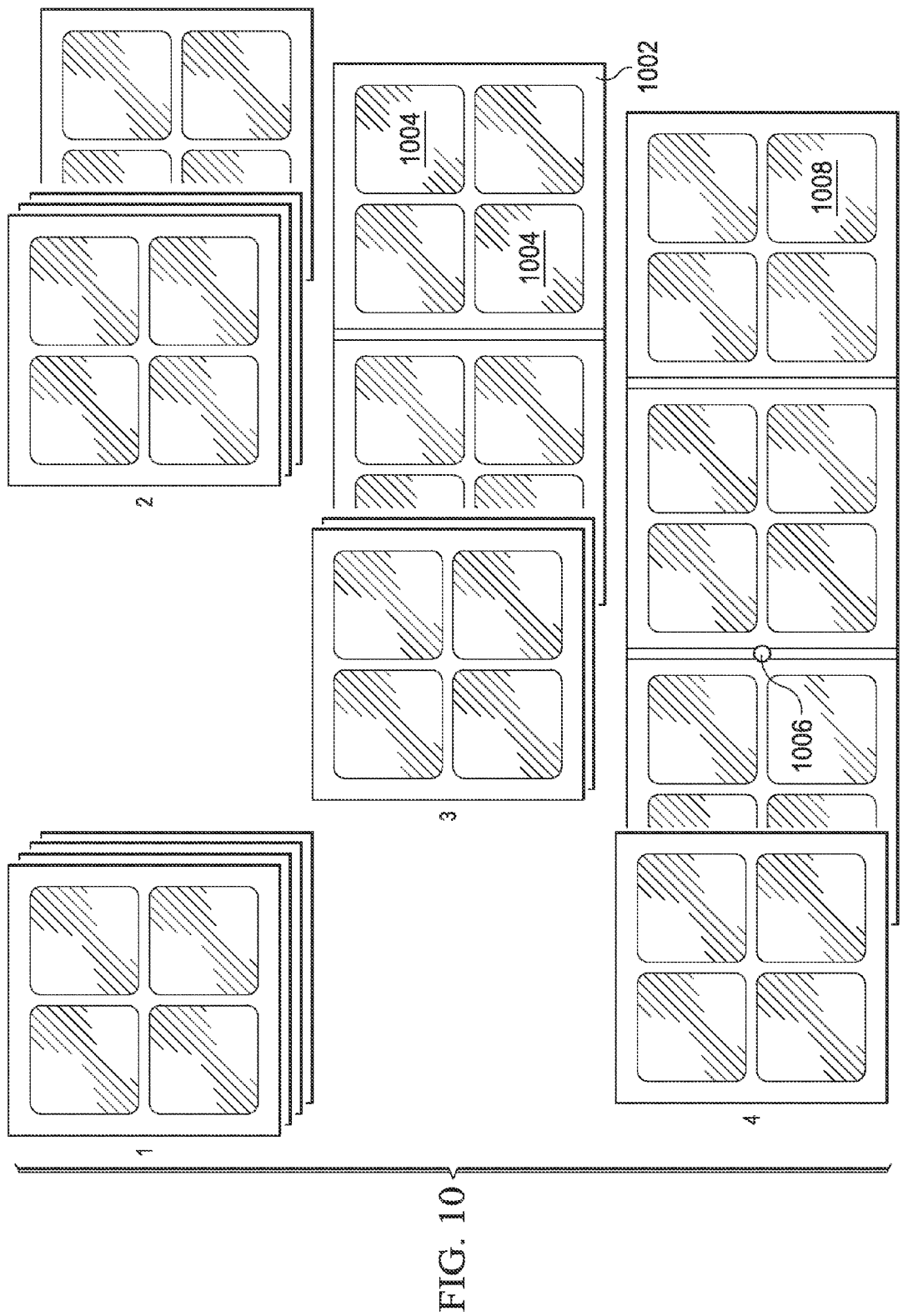
FIG. 10 illustrates another embodiment of a folding panel assembly.

Referring now to FIGS. 9 and 10, there are illustrated further packing configurations that would mimic the fold out configuration of a paper fan. Referring to the configuration of FIG. 9, a group of four modules 902 consisting of a two by two array of solar cells 904 are connected together at a single central pivot point 906. Thus, as illustrated in FIG. 9, in the completely folded configuration the assembly appears as a single two by two array of solar cells 904. The remaining three modules 902 are rotated out from behind the first panel 902 about the center pivot point 906. Each subsequent panel 902 is folded out until the final completed square configuration is achieved. The single attachment point 906 comprises the center of gravity of the device and utilizes a locking mechanism to prevent the modules from over extending.

Referring now to FIG. 10, the photovoltaic module 1002 can be stacked and deployed on a track mechanism that would allow each module 1002 to slide out from the remaining modules similar to a sliding door. Thus, each module 1002 has a tracked connection to its adjacent module along opposing edges 1004. Each subsequent panel 1002 slides out to a fully extended position and locks into place. Once completely extended the center of gravity of the assembly would be located as illustrated at point 1006. Each of the photovoltaic modules 1002 comprises a two by two array of solar cells 1008.

Figure 11:
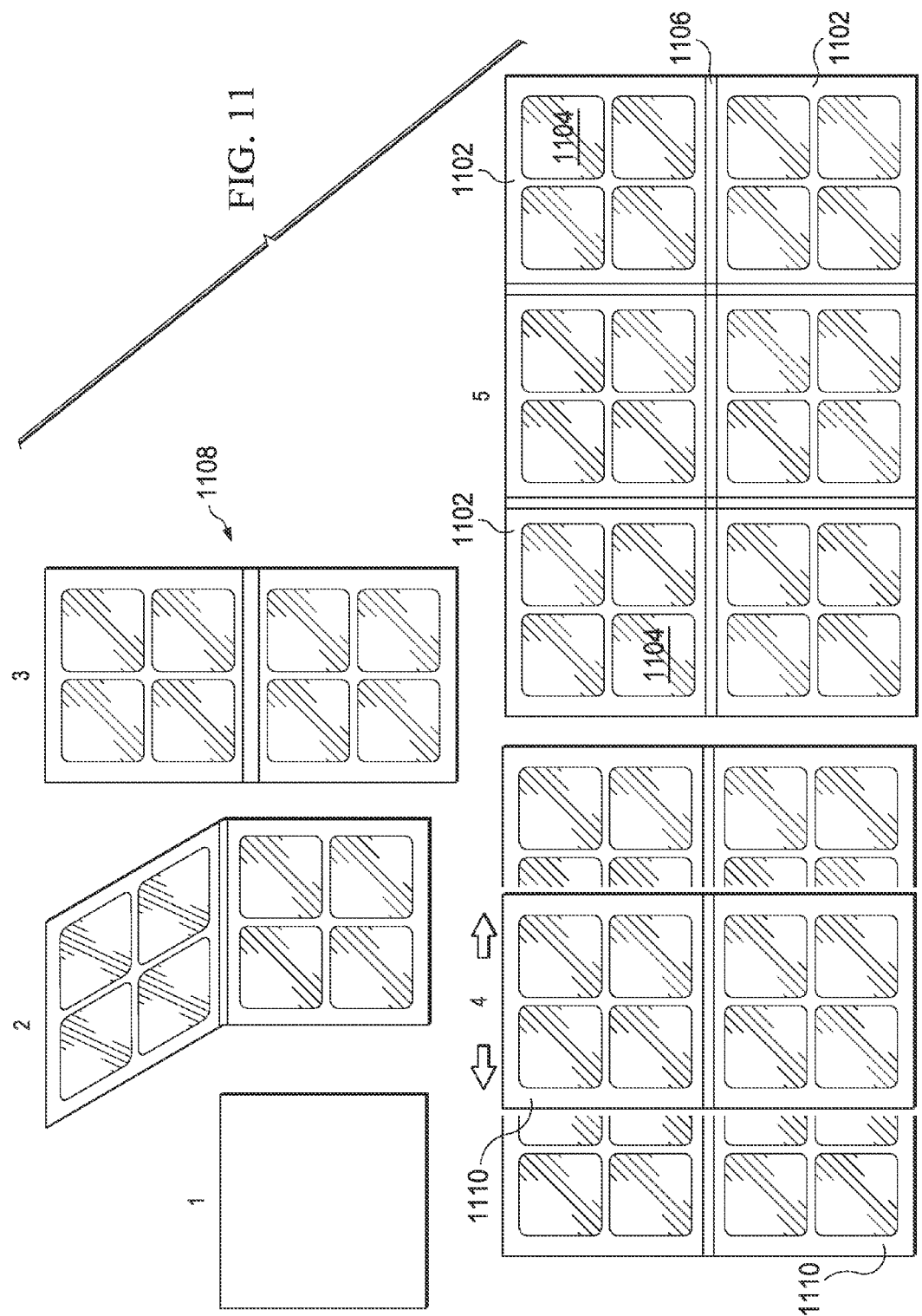
FIG. 11 illustrates a final embodiment of a folding panel assembly.

Finally, as illustrated in FIG. 11, a combination of both folding and sliding modules 1102 may be used to provide a compact configuration. In the configuration of FIG. 11, a group of six photovoltaic modules 1102 are interconnected. Each module consists of a two by two array of solar cells 1104. The top row of modules 1102 are folded over the lower row of solar module 1102 in the folded configuration along a center line 1106. When unfolded an overlapped four by two array of two separate modules 1102 is revealed as shown at 1108. The modules are slid out from each side of the two by four array along a connected track assembly along edges 1110.

Figure 12:
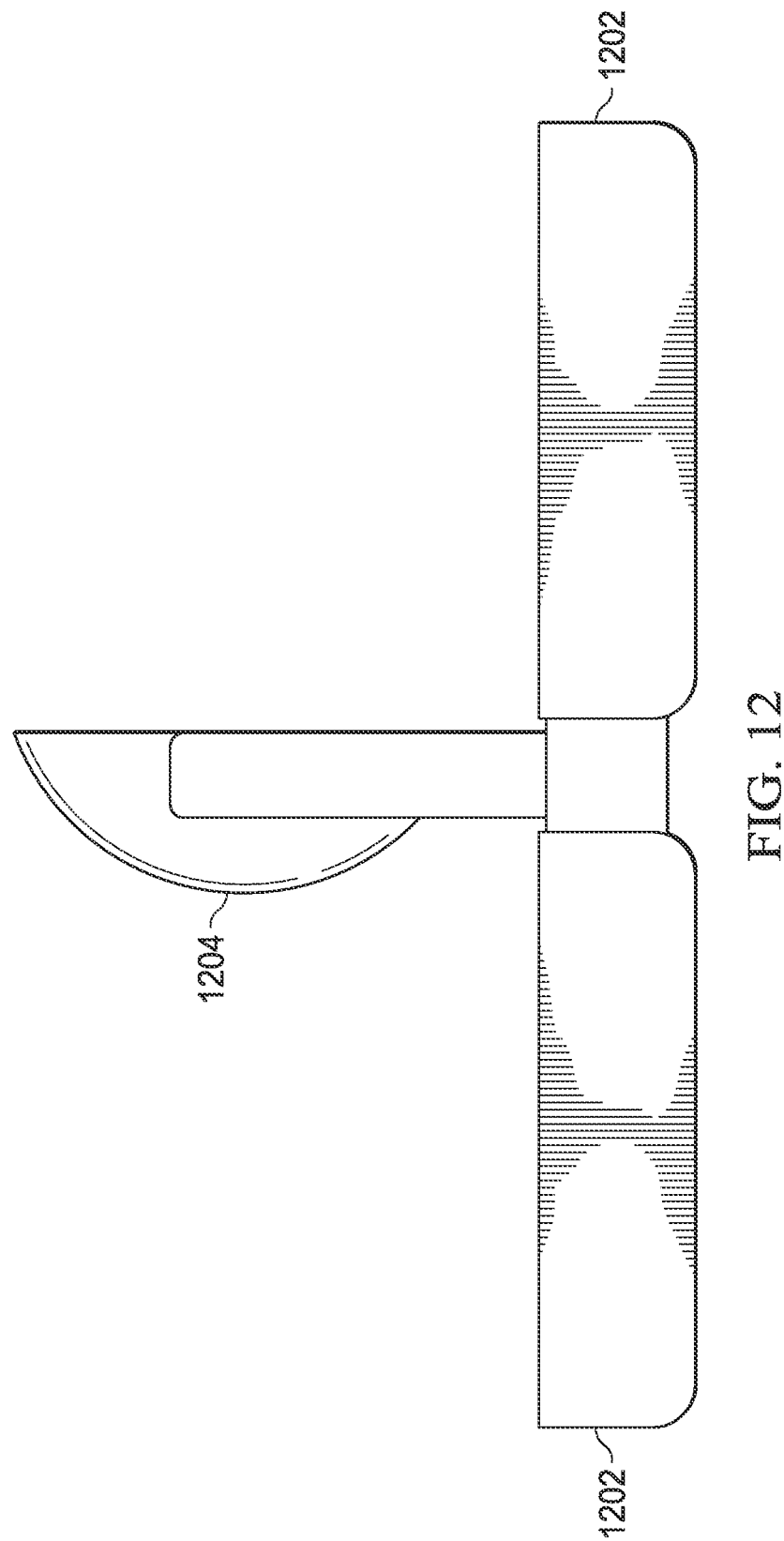
FIG. 12 illustrates a parabolic dish used in the portable solar energy receiver system.

Additionally, as illustrated in FIG. 12, rather than using a set of folded modules located within a carrying case a parabolic dish 1204 may be located within the carrying case 1202. The parabolic dish 1204 may be used to concentrate sunlight for concentrated photovoltaic module applications. The case 1202 in the unfolded position may act as a support base for the solar receiver.

Figure 13:
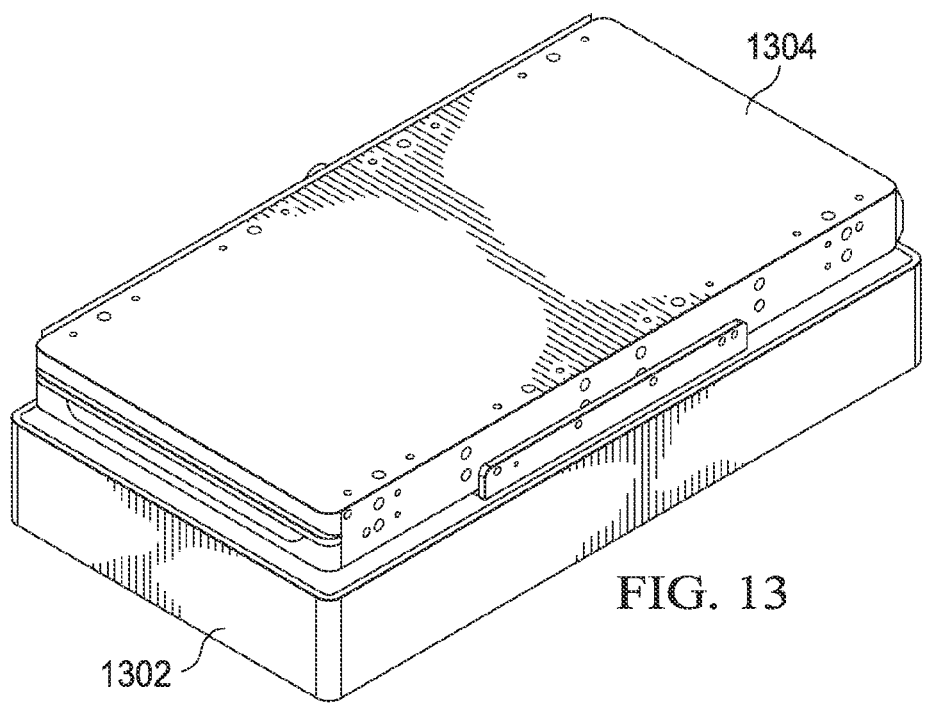
FIG. 13 illustrates an embodiment of the solar tracking mechanism and solar energy collector.

Referring now to FIG. 13, there is illustrated a further embodiment of a solar energy collector 102 and solar tracking mechanism 104. This deployable and retractable module comprises a fixed base 1302 and a rotatable, extendable and retractable panel assembly 1304. The fixed base 1302 comprises fixed components such as the drive motors, user interface, battery control electronics implemented in a printed circuit board assembly, slewing bearings and other components necessary for positioning a panel of photovoltaic or concentrator photovoltaic cells to track the sun in a desired manner.

Figure 14:
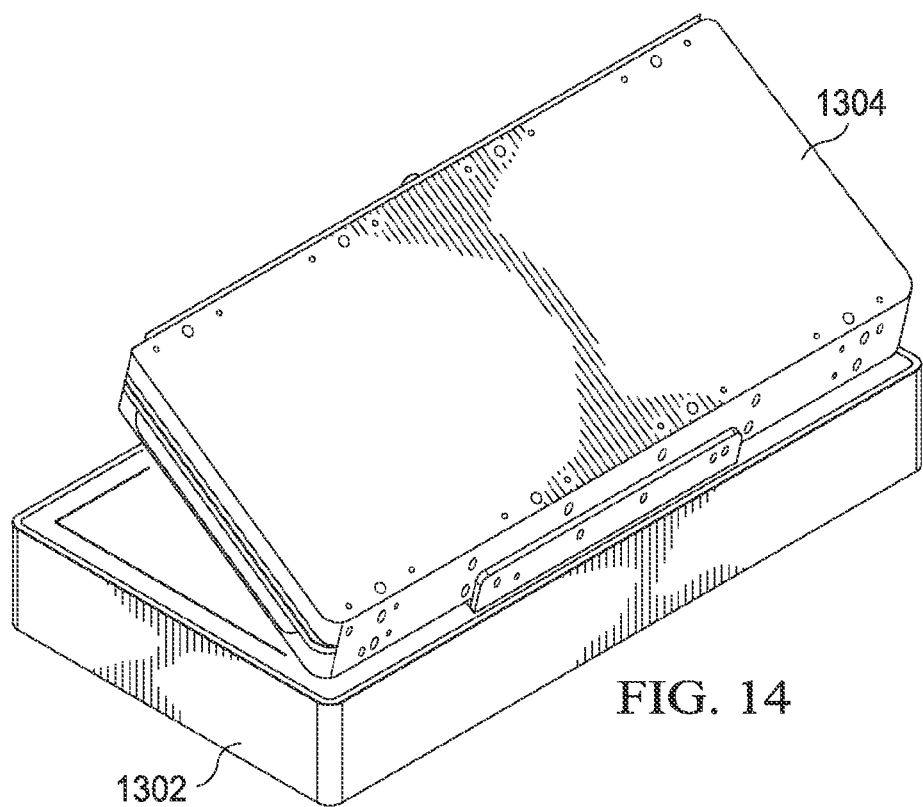
FIG. 14 illustrates a raised panel assembly.
Figure 15:
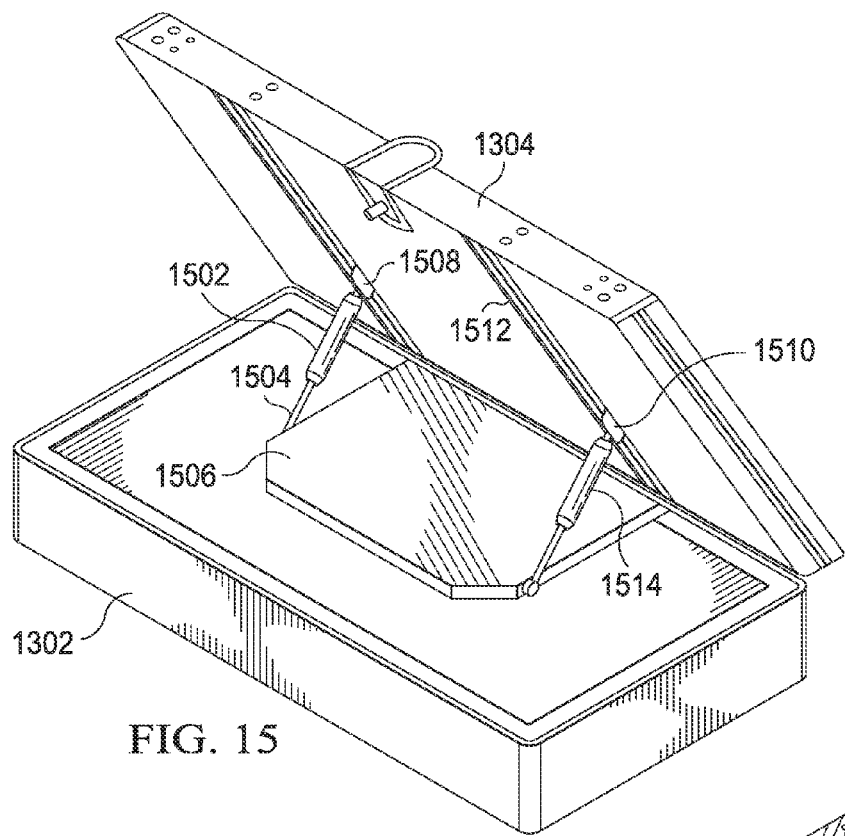
FIG. 15 illustrates the drive structure for raising and lowering a panel.

The panel assembly 1304 may be raised and lowered from the base 1302 as illustrated in FIGS. 14 and 15. The panel assembly 1304 is raised in order to place the assembly in a position to track a position of the sun. The panel assembly 1304 is raised and lowered via a pair of drive pistons 1502. The pair of drive pistons 1502 are connected at a first end 1504 to a rotatable base 1506. A second end 1508 of the piston 1502 is connected to a bracket 1510 within a sliding track 1512. When the piston 1502 extends, the bracket 1510 travels down the track 1512 moving the panel assembly 1504 to a raised position. Similarly, when the piston 1502 retracts, the bracket 1510 moves up the track 1510 lowering the panel assembly 1304 back towards the base 1302.

The pistons 1502 may comprise gas assisted or spring assisted pistons. Various pistons are available having varying degrees of pressurizations of gas within the piston thus providing varying degrees of extension force that assist in the raising and lowering of the panel assembly 1304. Within the storage process, when the panel assembly 1304 is to be lowered in a parallel plane to the bottom base 1302, the pistons 1502 are contracted causing the gas within the pistons to be pressurized by the folding action and the resistance of the gas within the piston to prevent the panel assembly 1304 from causing the panel assembly 1304 to crash into the base 1302. The pressure stored within the piston 1502 may be subsequently used to raise the panel assembly 1304. Similar effects can be realized using spring control piston 1502.

An additional embodiment may utilize the raising and lowering of the panel assembly 1304 using one or more linear motors. The pistons 1502 may alternatively comprise a pair of elevating struts that are manually raised and locked into position to support the panel assembly 1304. In this embodiment the panel assembly 1304 would be manually raised and the struts would also be manually raised and placed within a locking position on the back side of the panel assembly 1304.

Figure 16:
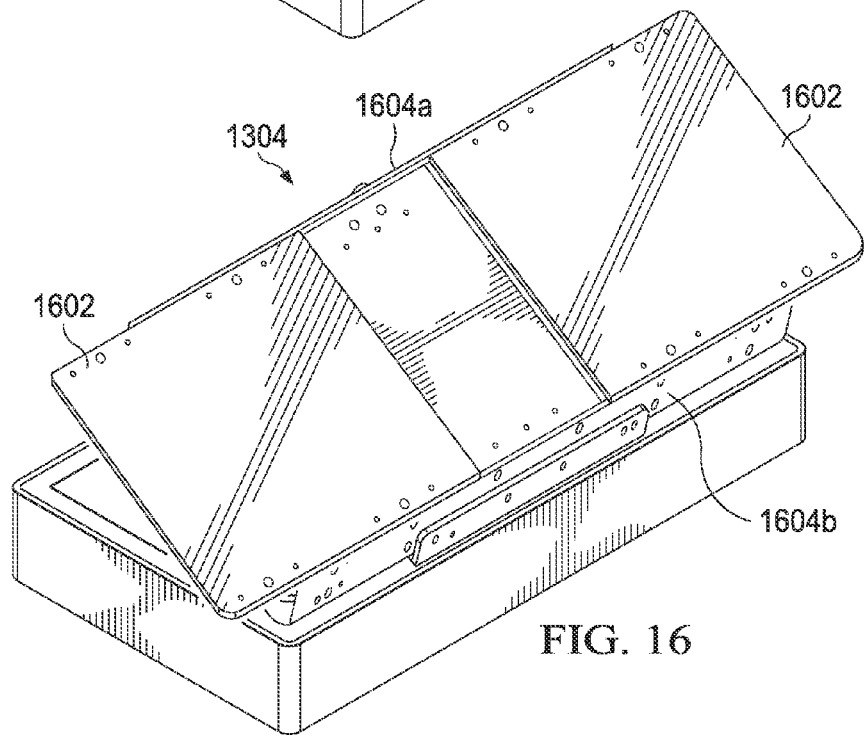
FIG. 16 illustrates a multi-module track connected assembly.

Referring now also to FIG. 16, there is illustrated the panel assembly 1304 having multiple individual panels 1602 connected via a track assembly 1604. Each of the panels 1602 comprise a circuit board including a plurality of photovoltaic or concentrated photovoltaic cells located thereon. The top and bottom edges of each of the panels 1602 slideably engage an upper track 1604a and a lower track 1604b. These panels 1602 slide to the left or the right to an extended position. The middle panel 1602 remains in a fixed position when the left and right panels are extended to an open position. In the stored position, the panels 1602 are retracted as previously illustrated in FIGS. 14 and 15 such that the entire panel assembly 1304 may be folded down into a storage configuration. The track assembly 1604 would additionally be connected to the rotatable base 1506 along a hinged connection 1514 (FIG. 15). Thus, the entire panel assembly could rotate on the rotatable base 1506 and be raised and lowered to enable rotation around an axis and movement for sun tracking. The angle of rotational axis relative to the surface of the rotating platform is adjustable either manually, semi automatically, or automatically by pivoting the panel assembly 1304 using the pistons, springs, struts or electric motors as described previously.

As the panels 1602 are deployed or extended, electrical connectivity between individual panel 1602 is established with mating connectors such as banana plugs whereupon the panel circuit boards are operating as a single electrical unit. Alternatively the panels may already be connected by insulated wires that are hidden behind the panels. Once the panel assembly 1304 has fully deployed, the system may be activated and available for tracking the sun.

Referring now to FIG. 17*a-d*, there is illustrated a configuration of the solar energy receiver 102 and solar tracking mechanism 104 as a portable solar electricity generator 1700. The portable generator 1700 is deployable in any area having a sufficient surface area for deployment of the built in automatic sun tracking photovoltaic cell array. The portable generator 1700 includes a user interface, internal batteries, and electronics built into a protective case 1702 enabling it to be moved over various distances and/or stored in small spaces. The portable generator 1700 includes an output interface 1704 enabling it to provide electrical power for various electrical/electronic devices through a variety of output ports. The product can not only serve as a portable solar powered electricity generating device, but dependent upon the various outputs included therein can function as an integrated audio and/or video entertainment and/or gaming center by including speakers, high fidelity (HiFi) electronics, LCD screens, or by providing connectivity for popular electronic gaming systems such as Sony Playstation, Nintendo's Wii station, and Microsoft X-Box gaming system.

With the appropriate electrical/electronics interface virtually any electronic device may be couple through the output interface 1704. As described previously, the power provided by the solar generator is sufficient such that these electronic devices may be powered without draining an associated storage battery included within the system. Devices that may be powered by the system include, but are not limited to, communication devices such as a WiFi router, satellite communication transceivers, lighting, heating and/or cooling devices. The external case 1702 provides mechanical protection against bumps and environmental hazards during transportation and operation. The case 1702 includes features enabling it to be temporarily mounted or affixed onto any surface for additional stability or anti-theft security purposes.

Figure 17A:
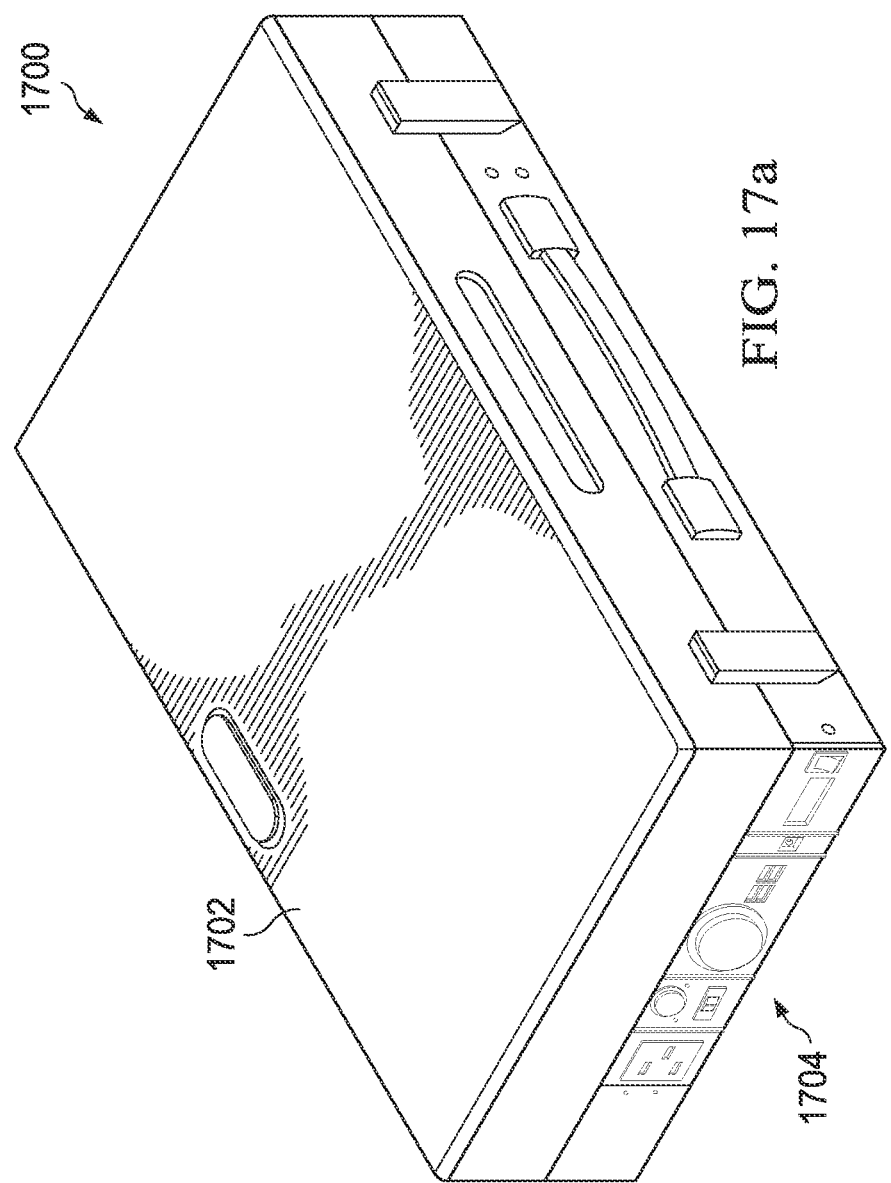
FIG. 17a illustrates a further embodiment of a solar energy receiver and tracking mechanism in a closed case.
Figure 17B:
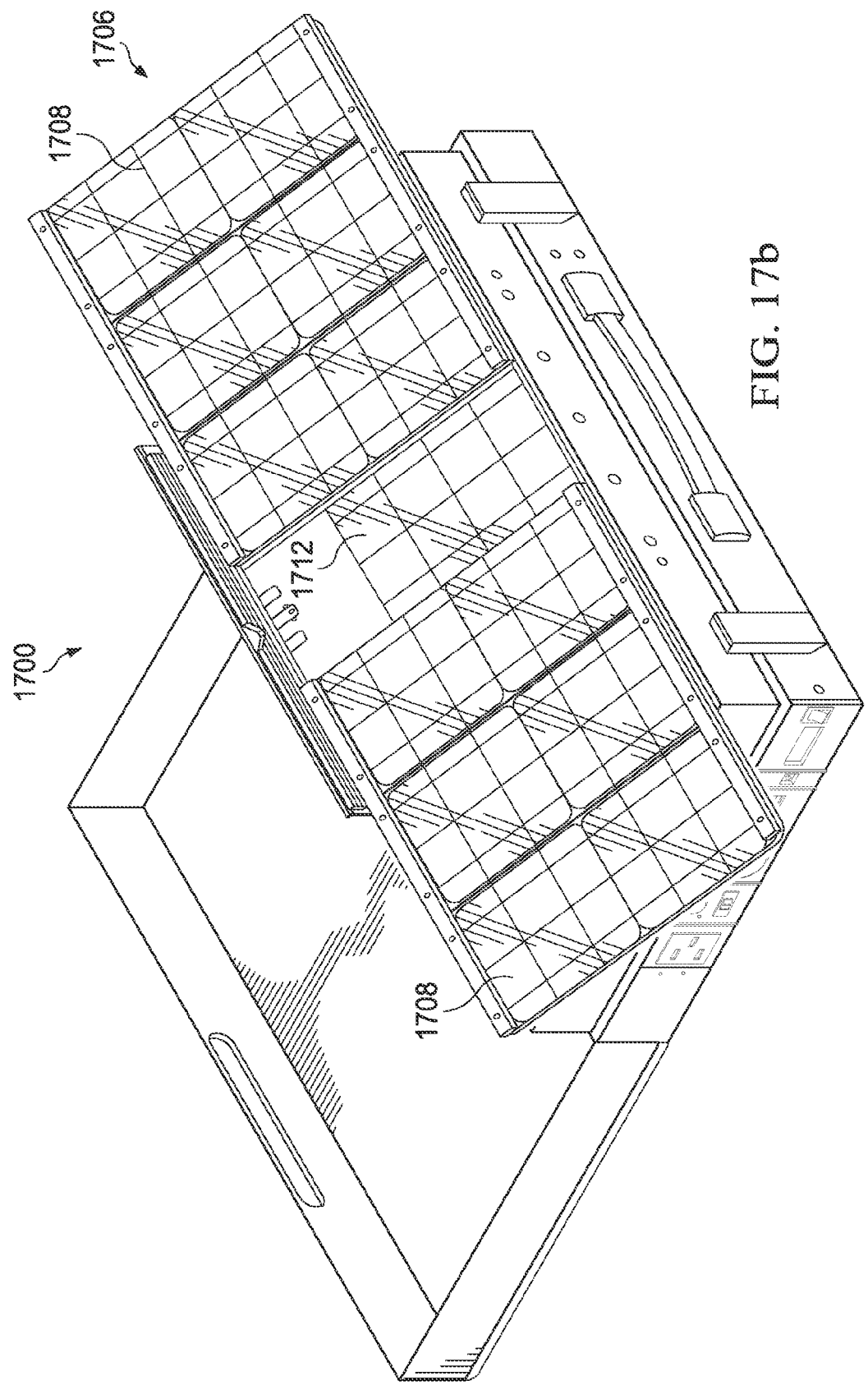
FIG. 17b illustrates the embodiment of FIG. 17a in an open configuration.
Figure 17C:
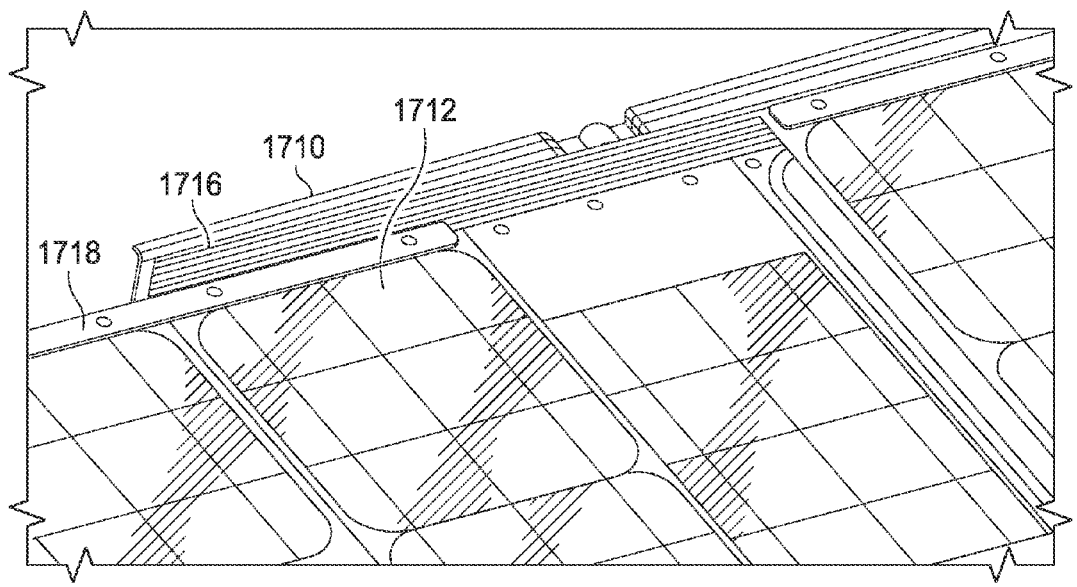
FIG. 17c illustrates the panels of sliding tracks.
Figure 17D:
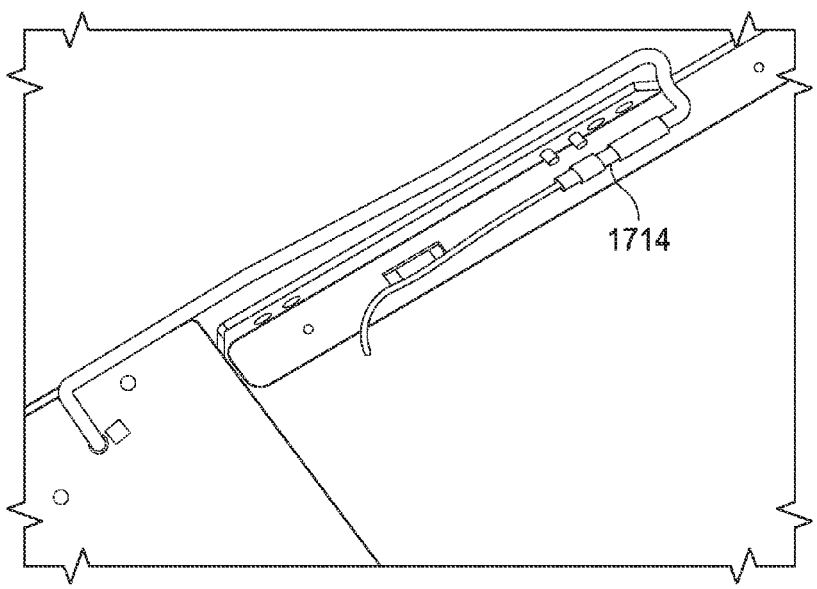

The charging panels 1706 include a plurality of sliding panel 1708 in order to achieve a compact portable design. The sliding panels 1708 are supported by a track structure 1710. The track structure 1710 additionally supports at least one non-sliding panel 1712 that does not slide on the track structure 1710 but is fixedly supported thereby. When the sliding panels 1708 are extended into a fully open position as illustrated in FIG. 17*b* electrical connections will automatically be made via quick connectors 1714 as illustrated in FIG. 17*d*. The quick connector 1714 automatically locks into place upon extension of the side panels into the fully open position. Connection of the quick connectors 1714 signals an operating mode to the system controllers which automatically detects the fully connected configuration. Alternatively, the panels 1708 may already be electrically connected by hidden wires and positional switches can be triggered when the panels are fully deployed to indicate a fully deployed panel configuration. The fully open side panels will also reveal openings for additional non-sliding solar cells mounted on the fixed panel 1712.

The solar panels 1708 and 1712 include groups of multiple cells. The solar panel 1712 is configurable into multiple sizes and power levels customizable by adding more modules or changing the number of cells. Depending upon the intended user application, the number of cells and modules may be customized to provide more than sufficient daylight power as to operate a variety of electronic devices simultaneously or as an integrated system without draining the built in batteries of the device. This increases the benefits of the solar generator during non daylight hours. The support structure 1710 additionally includes slide rails 1716 which engage slide frames 1718 mounted to the top and bottom edges of the sliding panel 1706. The slide frame 1718 additionally provides strength and support to the sliding panels 1708. It may be used for mounting the quick connectors 1714 as illustrated in FIG. 17*b*.

Figure 18:
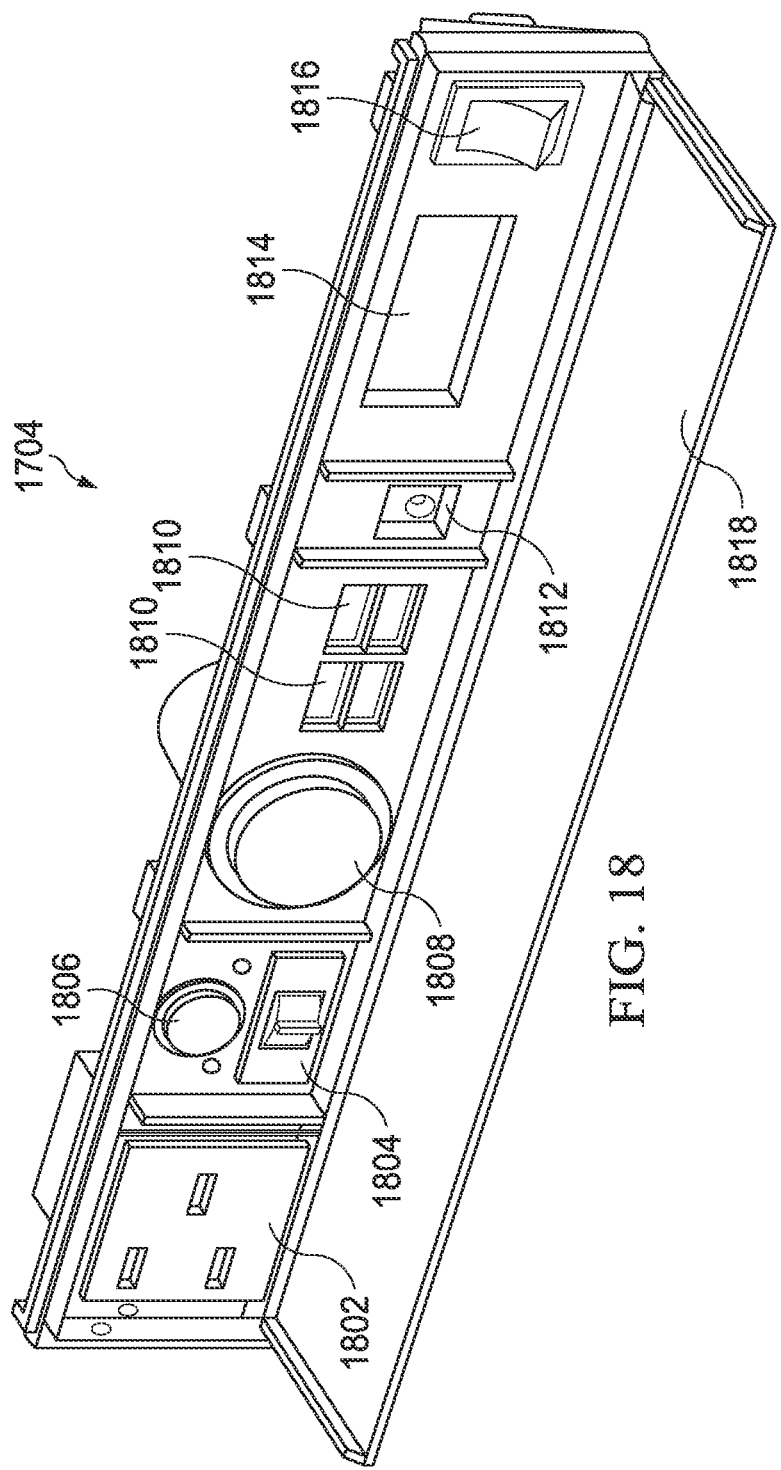
FIG. 18 illustrates a power interface for a solar generator.

The input/output interface 1704 includes a number of components providing a multitude of operations to a user. One example of the interface 1704 layout is illustrated in FIG. 18. FIG. 18 illustrates an interface including a number of sockets providing electrical power in various configurations. These outlets include a universal AC output 1802 into which a standard three prong power plug may be inserted. The AC output 1802 may include an associated voltage selector switch 1804 enabling a user to select the particular AC voltage level to be provided from the AC output 1802. Additionally, an AC output on/off switch 1806 may be provided for turning on and off the AC output 1802. The AC power output 1802 and associated selection switch 1804 can provide differing levels of AC power output depending upon the country where the unit is sold or being asked to operate. For example, the generator can provide either 110 volts or 230 volts depending upon the country of use. All laptops, mobile phones with AC adapters and general electronic devices can withdraw power from this AC outlet.

The output connector may also include a cigar jack 12 volt output 1808 and a USB power output 1810. The internal battery may also be charged from an external power source via a DC input jack 1812. In order to provide information to the user, LED lights and a flat panel display 1814 may be provided to present the user with various information necessary for operation of the system. The flat screen display 1814 can provide the user with information relating to how many hours and minutes the current battery can keep working when powering a particular electronic device. An on/off switch 1816 enables the entire systems to be turned on and off by the user. The user interface 1704 is protected via a cover 1818 that may be made out of transparent material to provide visibility of the interface and display status component when the cover 1808 is closed. While the present illustration provides just one configuration of a user interface, it will be understood by one skilled in the art that various other configurations and additions may be made.

The system can alternatively be configured to supply DC electrical power either via a cigarette type 12 volt socket 1808, a typical USB outlet 1810, or other outlet jacks which can directly charge electronic devices. A five volt, two amp power could be supplied by each outlet allowing it to charge many different types of portable hand held devices. The charging of devices will draw power from the charger's internal battery. The charger's internal battery is in turn recharged by the solar panel as the system generates higher voltage than that of the battery or may be charged via the DC input jack 1812. The charging status information will then be calculated and displayed by the charging device display 1814 informing the user how much time duration remains that the device may continue working.

For example, a hand held device with a 25 watt per hour battery will take about 2.5 hours to be charged by a 10 watt USB outlet. The cigarette socket jack 1808 can typically supply 12 volts, ten amps for higher power needs of devices normally used in automotive environments. In other applications, custom or standard DC jacks can supply power to a power aggregating device which combines the like DC voltage power from a number of solar chargers such as the charger 1702 (FIG. 1700) to charge a number of generic external battery packs or simply provide increased power supply for an input/output interface 1704 (FIG. 1700) by combining the currents internally within the aggregating device.

Figure 19:
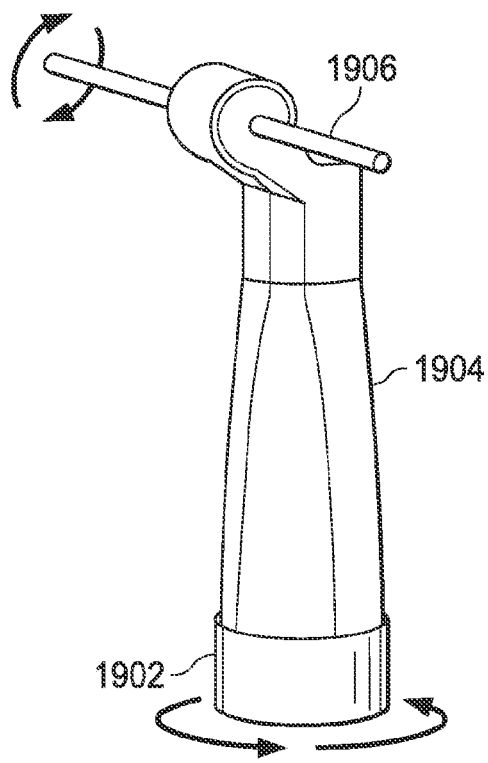
FIG. 19 illustrates a further embodiment of a solar tracking mechanism.

Referring now to FIG. 19, there is illustrated a further embodiment of a solar tracking mechanism for use with a CPV or a PV solar receiver. In this embodiment, the solar tracking mechanism includes a fixed base 1902 that is fixed to a surface of pole upon which the tracking mechanism is mounted. As described previously, the fixed base 1902 could be fixed within a carrying case that makes the apparatus portable or to the top of a street lamp, pole, or parasol to provide an electrical power or charging station to a closely located electrical device. A rotating housing 1904 rests within the fixed base 1902 and is able to rotate 360 degrees in the azimuth direction in order to enable the device to track the position of the sun. The coupling between the rotating housing 1904 and the fixed base 1902 may be a slewing bearing or a simple cylinder hole to shaft construction such that the housing is constrained to rotate only in the azimuthal direction. The relative angle of the rotational housing 1904 with respect to the fixed base 1902 may be determined using sensors and/or switches included within the device. A rotating shaft 1906 pivots upon the rotating housing 1904. The rotation angle of the rotating shaft 1906 may be limited to a predetermined altitude direction or adjusted by a motor that rotates the rotating shaft 1906. The rotation angle of the rotation shaft 1906 may be determined using sensors and/or switches within the device. Solar cells or panels may be mounted on the rotating shaft 1906 by means of some type of housing that is directly mounted to the rotating shaft. The housing may be split into several housings that may be removed and packed separately for use in a portable system.

Figure 20:
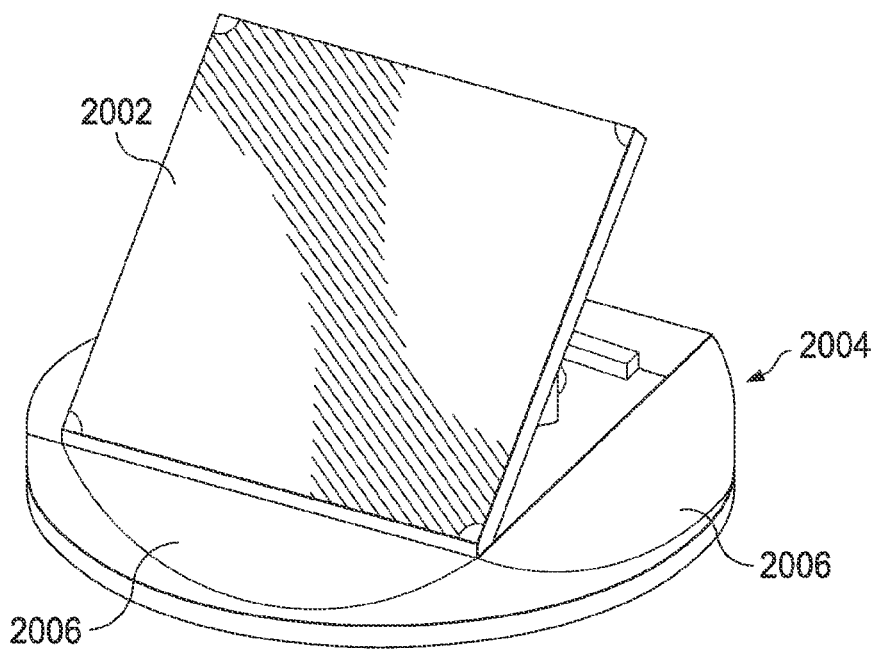
FIG. 20 illustrates a solar receiver and protective base.

Referring now to FIG. 20, there is illustrated yet a further embodiment of a solar receiver and tracking configuration wherein an array module 2002 may be recessed within a protecting rotating base 2004. The sides of the rotating base 2004 include sloped surfaces 2006 to protect the mechanism from wind and/or other elements. The implementation of FIG. 20 is suited for configurations wherein the panels need to deflect strong air flow and the sloped sides 2006 of the base 2004 enable air to be deflected around and over the base. Such redirection of air flow may serve secondary utility as to be self cleaning of the solar cells and provide primary or secondary energy conversion of the directed air flow. In the event of a particularly strong air flow, the panel 2002 may be retracted either automatically or semi-automatically into the protective housing 2004. Such a configuration may be made small enough as to fit inside a case as to be easily transported which case may be equipped with components as provided for the portable generator 1700, including an input/output interface 1704. A large configuration may be made which could be fitted onto the roof of a recreational vehicle (RV) whereupon the various other system components described in FIG. 1 may be housed within the RV and interconnected to the tracking panels embodied in FIG. 20.

Referring now also to FIG. 21, there is illustrated a side view of the configuration of FIG. 20. This view illustrates the mechanism for raising and lowering the panel 2002 into and out of the fixed housing 2004. As can be seen, the fixed housing 2004 has a hinged connection to the panel 2002 along hinge line 2010. The rotating housing 2004 rotates upon a fixed base 2012. A support arm 2014 raises and lowers the panel 2002 into the rotating housing 2004 using a drive motor 2016. An additional motor (not shown) located within the moved rotating housing 2004 may be used for rotating the rotating housing 2004. The rotary motion of the drive motor 2016 is converted into linear motion to raise and lower the panel 2002. One end of the arm 2014 is attached to a bracket via a rotary joint such that it is rotating around the Y axis relative to the bracket. The other end of the arm is attached to a shaft that runs parallel to the Y axis across the panel.

Figure 22C:
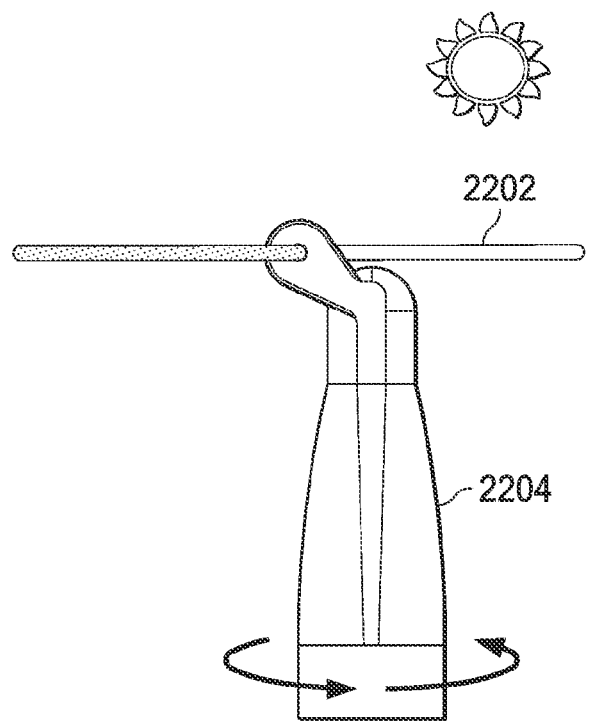

There are many ways to implement tracking of the sun's position by a solar tracking mechanism associated with the solar receiver, whether by a fixed algorithm that depends upon a known position of the sun during the course of a calendar year or by some way of measuring the relative strength of sunlight on two or more sensors associated with the solar panels. No matter which way is used, the device may rotate in an azimuth direction first followed by rotation to adjust the altitude direction until the solar cells are perpendicular to the incoming sunlight. Adjustments are then made in the altitude and azimuth position throughout the day to maintain maximum electrical power generation. Referring now to FIG. 22*a* through 22*c* there is illustrated a typical tracking scenario.

Figure 22D:
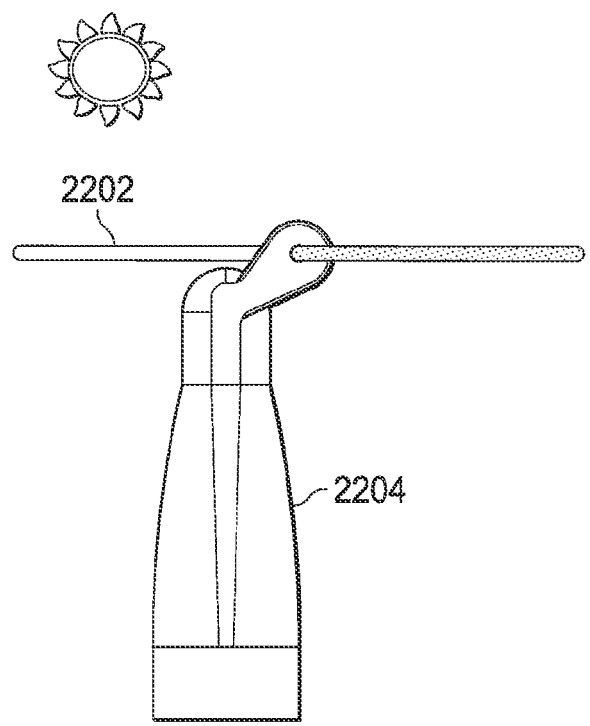
Figure 22E:
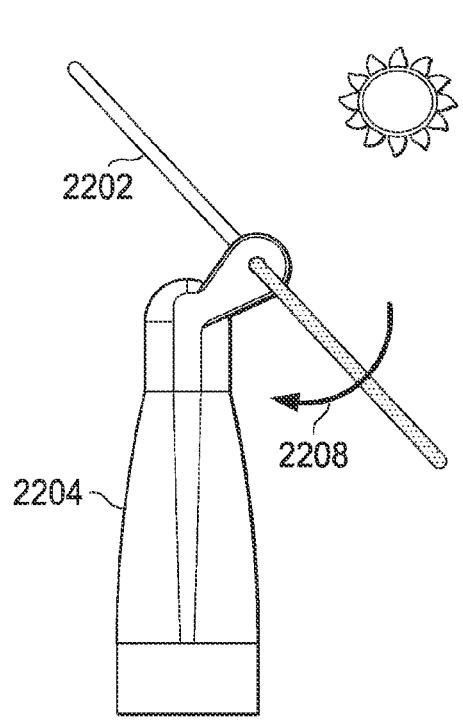
Figure 22F:
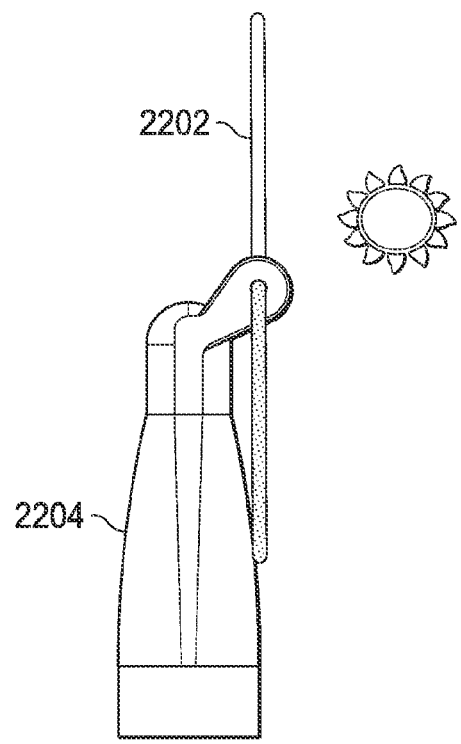

FIG. 22*a* illustrates a solar receiver including panels 2102 and a tracking base 2204. When the process is initiated at sunrise or some predetermined time near sunrise, the tracking mechanism will first track the sun's azimuth direction and rotate the position of the panels as necessary. This is followed by a detection of the altitude direction of the sun. At sunrise, the azimuth will face the panels in the direction of the rising sun on the horizon while the altitude direction will be substantially at 90 degrees. Next, as illustrated in FIG. 22*b*, the tracking operation will rotate the altitude of the panel 2202 upward in the direction indicated by arrow 2206 to follow the rising track of the sun. Next, as illustrated in FIG. 22*c*, once the altitude angle of the panel 2202 reaches 90 degrees the tracking mechanism will rotate the base 2204 in a 180 degree azimuth direction to the position illustrated in FIG. 22*d*. Then, as illustrated in FIG. 22*e*, the solar tracking will continue and the altitude of the panel 2202 will move in the direction indicated by the arrow 2208 as the sun begins to set towards the western horizon. Finally, the device reaches its maximum altitude declination when the panel 2202 is at a substantially 90 degree angle when the sun sets as illustrated in FIG. 22*f*.

Figure 23:
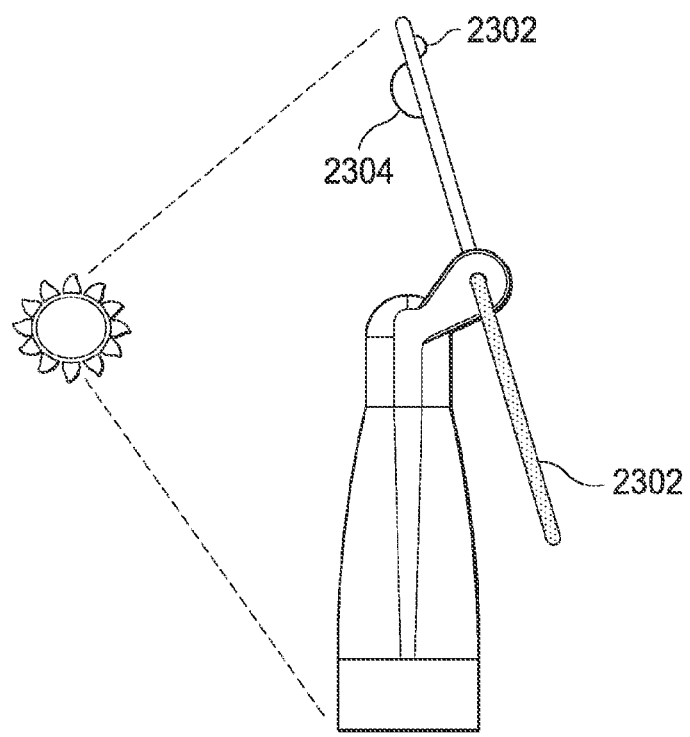
FIG. 23 illustrates sensor placement on solar panels.

The process illustrated in FIG. 22*a* through 22*f* is facilitated by the placement of sensors on the face of the panel 2202, or alternatively on the edge of the panel 2202. However, the system may be further improved by placing sensors both on a front face of the panel at 2302 and on a back face of the panel at 2304 as illustrated in FIG. 23. The front sensor 2302 tracks the movement of the sun when the panel is facing in the appropriate direction. Placement of rear solar sensors 2304 on the rear side of the tracking module enable the rear sensors 2304 to work with the front sensors 2302 to determine the sun's relative location with respect to the panels 2202. With this configuration the system can control the solar receiver system to face any direction at its initial start up position. The front solar sensor 2302 is intended to face the sun. However, the tracking mechanism would not work if the system was placed in such a way that the front sensor was shielded from the sun. By placing a rear sensor 2304 on the rear face the user may place the receiver system at any start position irrespective of the sun's relative position. The sun will be detected by either the rear sensor 2304 or the front sensor 2302 when the system is initialized.

To control the tracking of the sun the controller 114 aligns the tracking mechanism perpendicular to the sun's rays. The positioning of the solar cells can be achieved by using a simple control algorithm provided by the system controller 114. In addition to providing control to the tracking mechanism 114, the system controller 114 may control the manner in which energy is being provided to the battery charger 110 to control the battery charging operation. While the solar energy receiver 102 will collect enough energy to charge the batteries 112 while powering multiple devices or machines, the power transfer from the battery charger 110 to the batteries 112 must be regulated or controlled to avoid damaging the battery and to achieve maximum power from the photovoltaic devices within the solar energy receiver 102. If the voltage of the battery does not match the voltage from the solar cells within a certain range, the battery may be harmed or not charge quickly enough to avoid being drained. Obtaining maximum power from the solar cells without damaging the battery can be done in a few different ways. A maximum power point transfer charge controller can be used within the controller 114 but requires the use of heat sinks in order to absorb excess heat. The easiest fashion to match voltage between the battery cell and the solar cells is to increase or decrease the amount of solar cells used by the solar receiver without the use of an MPPT charger. Careful matching of battery type configuration and cell voltage results in optimum efficiency and cost.

One manner for increasing or decreasing the number of cells providing power to the battery charger is illustrated in FIG. 24. The controller 114 monitors the battery voltage being provided from the cells of the solar energy receiver 102 at Step 2402. If these voltages are within an appropriate range as determined at Inquiry Step 2404, control passes back to Step 2402 to continue to monitor the voltages of the batteries and solar cells. If Inquiry Step 2404 determines that the voltages are not within the desires ranges, Inquiry Step 2406 determines whether the voltages from the solar cells need to be higher or lower. If the voltages need to be higher, the number of cells that are active and used within the solar energy receiver 102 is increased at Step 2408. If the voltage is high, the number of solar cells used with the receiver is decreased at Step 2410. Control then passes back to step 2402 from each of Step 2408 and Step 2410 to again monitor the battery and solar cell voltages.

The solar energy generation device market is rife with a multitude of solar generator systems that utilize various different photovoltaic or concentrator photovoltaic cells that are combined in different manners to produce different configurations of panels that provide different direct current (DC) voltages. Such systems require different DC to DC converters either to step up or step down the output voltage to charge a specific battery cell used as an electrical storage medium, or to drive an inverter to convert the DC voltage to an AC voltage. Various battery configurations are also available in differential voltage and current characteristics that are designed for a specific PV/CPV configuration. The same goes for inverters which typically accept only one DC voltage and output a single AC voltage that conform to a specific country's specification.

Referring now to FIG. 25, there is illustrated a universal converter 2502 defining a common architecture whereby many different solar energy components may be integrated or connected together to operate as a coherent single system regardless of the manufacturer of the device component or subsystem. The universal converter 2502 receives control signals from an associated controller 2504 that controls the regulated DC output voltage that is provided. The input DC voltage from the solar receiver photovoltaic panel is provided to an input 2506. The converter 2502 converts to a regulated DC output voltage that is provided at the output 2508. The converter 2502 accepts a variety of DC input voltages and a variety of connections from varying different kinds of photovoltaic panels. The converter 2502 additionally outputs a range of voltages as selected manually or automatically by the user through the controller 2504. A multitude of different PV panel assemblies of different manufacturers may be interconnected to a variety of different batteries of different voltage characteristics using the universal converter 2502, thereby enabling a user to pool several assemblies together to generate greater amounts of power output to charge a variety of battery configurations and combinations. This allows a user to power electronic devices of greater wattage consumption than was previously possible without pooling several assemblies. The universal converter 2502 may be designed as a stand alone product and sold as an accessory to different PV panel or solar energy generator manufacturers.

Referring now to FIG. 26, there is illustrated a universal inverter 2602. The universal inverter 2602 receives a regulated DC voltage input at input 2604 and provides an output AC voltage at output 2606. The AC output level and DC input level that may be processed by the universal inverter 2602 are controlled responsive to inputs from a controller 2504. The inverter 2602 is modular and universal in that it can be configured to accept different DC voltages and output a variety of different AC voltages of different frequencies. The most common AC voltage outputs would be 110 volt/60 hertz or 240 volt/56 hertz. The inverter 2602 may be designed as a stand alone product and sold as accessories to different photovoltaic panels or solar energy manufacturers.

Figure 27:
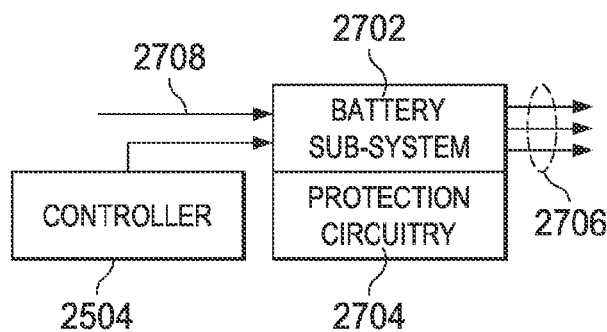
FIG. 27 illustrates a battery subsystem.

Referring now also to FIG. 27, there is illustrated a battery subsystem 2702. The battery subsystem 2702 has a universal and modular architecture and may be equipped with protection circuitry electronics 2704 that provide protection from electrical short circuit or over voltages conditions. The battery subsystem 2702 may also include controls to enable different voltages and connectors to be derived from the battery subsystem thereby enabling a variety of devices to be charged by the battery such as a device requiring a USB connector, a 12 volt cigarette connector, etc. This will enable the system to include a number of outputs 2706 responsive to a single charging voltage input 2708. The battery subsystem 2702 like the other universal components is provided control via a controller 2504. The battery subsystem 2702 may be designed as a stand alone product and sold as an accessory to different PV panels or solar energy generator manufacturers.

Figure 28:
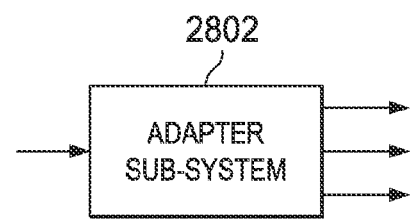
FIG. 28 illustrates an adapter subsystem.

Referring now to FIG. 28, there is illustrated an adapter subsystem 2802 that would provide for the mating or docking of the battery subsystem 2702 with various types of connection outputs. The adapter subsystem 2802 would provide a bank or collection of custom adapter outputs suited for various third party electronic devices. Thus, the adapter could power a gaming system such as Nintendo Wii or Microsoft X-Box, or Sony Playstation. Different dockable or connectible adapters 2802 would be provided for other popular electronic devices such as a karaoke system, WiFi and satellite communication system, cellular signal booster system, CD/DVD player and MP3 player, a GPS unit, a satellite TV receivers, a heating/cooling system, area lighting, party lighting systems such as light pulsing and projection, or HiFi sound systems, etc.

The adapter subsystem 2802 could additionally be packaged as a stand alone module or subsystem that could be docked into the universal system as a whole. Architecture of the above described components enables a user to combine and utilize the various components of various solar energy generator systems as a single integrated unit which can provide a range of configurations as required by different electronic devices having different input voltage requirements. Thus, a range of third party products may be connected eliminating or reducing the obsolescence of a product as a consumer changes or acquires different solar energy generator components that were previously incompatible. Just as the electrical aspects of the architecture have a modularity concept, these same modularity concepts can be applied to the mechanical design of the various subsystems or stand alone products.

Figure 29:
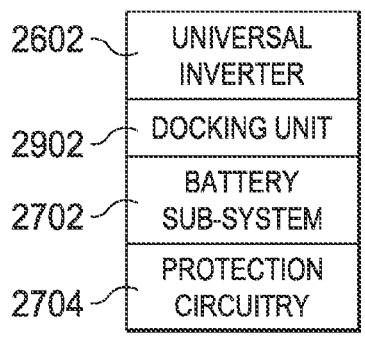
FIG. 29 illustrates a portable power hub modular configuration.

For example, as illustrated in FIG. 29, a portable power hub may be configured wherein a stand alone portable battery system 2702 and associated battery protection circuitry 2704 may be interconnected with a stand alone inverter subsystem 2602. The battery subsystem 2702 and inverter subsystem 2602 may be interconnected using a docking mechanism 2902 whereby one unit may be stacked on top of the other unit and appropriately located reciprocal mating connectors on each subsystem provide electrical connectivity between the two subsystems. The docking process also provides a mechanical locking mechanism to hold the two subsystems together via the docking unit 2902.

Figure 30:
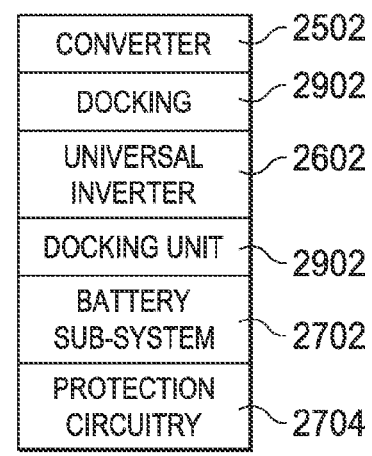
FIG. 30 illustrates a further power system modular configuration.

The purpose of this stacking capability is to facilitate packing and transporting the two subsystems together as a single unit and to provide complimentary utility to one another, e.g. the battery subsystem would provide the DC power to the inverter subsystem as to generate AC voltage. In addition, as illustrated in FIG. 30, the universal converter 2502 may be added to the combination of the universal inverter 2602 and battery subsystems 2702. The universal converter 2502 would also be interconnected using a docking unit 2902. The converter 2502 would be designed mechanically and electrically such that the converter 2502 would also utilize the docking unit 2902 to enable it to mate with the battery subsystem 2702 and inverter subsystem 2602. Thus, a variety of DC voltage power via different DC connectors could be provided.

Using these configurations, the various subsystems described with respect to FIGS. 25 through 28 may be interconnected both electrically and mechanically enabling a user to provide a modular solar energy generation system that can provide functionality that stands alone or as an interconnected subsystem while also allowing electrical connectivity to third party components such as batteries and photovoltaic panels. The docking units need not necessarily be vertically facilitated but may encompass docking horizontally or on a common plane. By providing interfaces to third party components, users can create custom configurations based upon their needs. Obsolescence is substantially eliminated or reduced as users need not abandon previously purchased components of other manufacturers and may integrate such third party components into a universal system.

Figure 31:
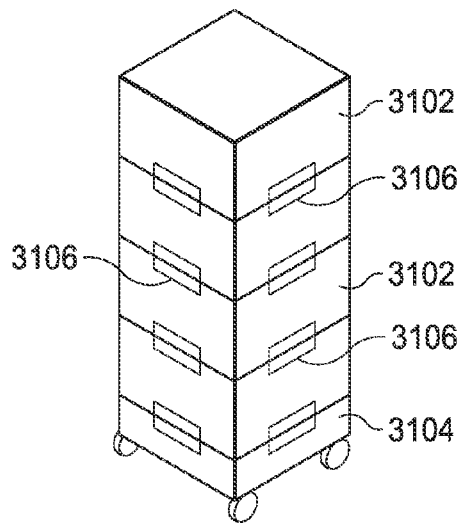
FIG. 31 illustrates a stackable configuration of the modular units.

Referring now also to FIG. 31, as more and more subsystems 3102 are interconnected, the user may find it convenient to transport the various units as a single unit. In such situations, the universal architecture provides for attaching a wheel base 3104 to the interconnected subsystem 3102 thereby allowing the user to easily move the entire unit regardless of how many subsystems 3102 are stacked on top of each other. There is no need to disconnect the subsystem 3102 from one another or to transport them separately. Each subsystem 3102 is mechanically locked into place via an associated locking mechanism 3106. The subsystems 3102 will not separate unless detached manually by a user. This creates a very easy configuration for portability and better user experience as a fully functioning unit may be moved to where power and utility is needed.

Figure 32:
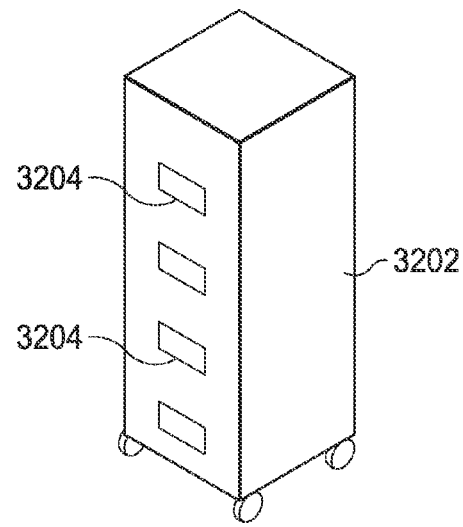
FIG. 32 illustrates a protective enclosure for the modular units.

Referring now to FIG. 32, to complete the architecture a protective enclosure or case 3202 encloses the entire interconnected unit thereby affording a measure of protection against inclement weather without limiting access to the electrical interfaces of the unit. The enclosure 3202 may be placed over the connected subsystems 3102 and associated openings, windows, or doors 3204 may be used for providing access to the controls and displays of the subsystems 3102. The windows 3204 provide access to the electrical interfaces of the unit. Such interfaces are electrically extended through the enclosure/case 3202 enabling the connections to be available externally for the user to access by manually uncovering the extended interfaces as needed or making access available by shielding the extended interface under hoods.

Figure 33:
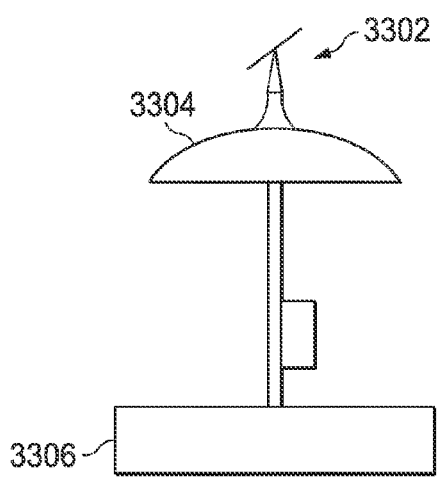
FIG. 33 illustrates a commercial application of a solar energy receiver.

Referring now to FIG. 33, there is illustrated one implementation of a solar energy receiver and tracking mechanism that is implemented within a particular commercial application. The solar receiver and tracking mechanism of FIG. 33 may comprise a configuration similar to that discussed herein above. The solar energy receiver and track assembly 3302 may be mounted atop a structure such as an umbrella 3304 associated with a table 3406. The solar receiver/tracker 3302 would be mounted atop a pole of the umbrella 3304. The solar receiver/tracker 3302 allows the photovoltaic panel to track the sun both vertically and horizontally. The sun tracking system is designed for mounting on structures with limited mounting services such as overhead road signs, bollards, or even patio umbrellas as illustrated in FIG. 33. The spindle mounted sun tracking system 3302 provides enough power to charge devices such as laptops, mobile phones, or electronic tablet devices such as tablets.

Figure 34:
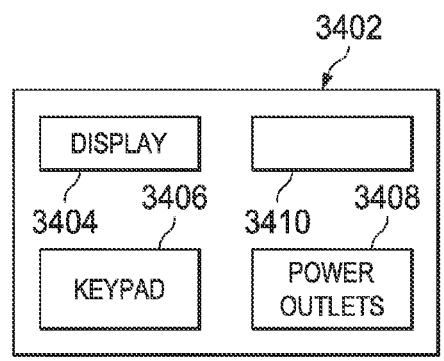
FIG. 34 illustrates an access interface of the system of FIG. 33.

Associated with the solar tracker receiver and tracking mechanism 3302 is an access interface panel 3402 as illustrated in FIG. 34. The access interface 3402 would comprise a secure authentication and electricity dispensing device that is integrated with the solar tracking mechanism 3302. The access interface 3402 would comprise a payment or authorization mechanism that enables access to the electricity generated by the solar receiver and tracking mechanism 3302 and could be implemented in a number of ways. The basic configuration would provide some type of display 3402 through which visual indicators may be provided to a user. A keypad 3406 would enable the user to enter information to authenticate access and facilitate payment for the provision of electricity services.

Power outlets 3408 would provide the ability for the user to plug into the solar generator and receive the energy being provided from the system 3302. An authentication/authorization code may be entered via the keypad 3406. The authentication/authorization code may be provided manually or electronically at the umbrella station or via (near field) wireless communications or via off station wired or wireless communications control. Codes can be determined and provided by the operator of the umbrella mounted solar generator. A battery may be externally connected to the system to provide uninterrupted power whether the sun is visible or not up to the capacity of the electricity stored within the battery of the system. If the power generated by the system is more than the electricity required by the user of the connected device, the associated battery may be simultaneously charged to a fully charged level.

The electricity generated is made available to a user on the same access interface 3402 via the power outlets 3408. The power outlets 3408 as shown may comprise a USB port, AC output, DC output, or multiple USB ports. Another function included within the access interface 3402 is a timer which indicates the duration of available electricity current from the battery to the electronic device being charged. Like the provision of the access codes, the amount of time available for use is determined and controlled by the operator of the system. When authorization/authentication codes are entered into the access interface 3402, electricity is switched on and delivered via any number of power outlets 3408. Electronic systems and protocols may be integrated with the access interface 3402 to provide for a seamless user experience while enabling the provider of the power service to customize the deployment of the services provided. A multitude of additional services besides electrical power may be provided such as enabling a WiFi hot spot, enabling an entertainment service device such as a connected TV, gaming system, karaoke system and/or enabling/powering order entry devices for use by food and/or beverage operators through a content output 3410. In this case, the content provider or dispensing device would receive its power from the associated solar receiver and generator 3302.

It will be appreciated by those skilled in the art having the benefit of this disclosure that this portable modular sun-tracking solar energy receiver system provides a system and method for tracking the sun and storing energy in a portable configuration. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A portable solar energy generation system, comprising
   a solar energy receiver having a plurality of solar cells for converting solar energy into a DC voltage;
   a solar tracking mechanism enabling the solar energy receiver to continuously track a position of the sun with respect to the solar cells and to position the solar cells responsive thereto;
   power circuitry for generating at least one output voltage for powering an electronic device responsive to the DC voltage; and
   a housing containing the solar energy receiver, the solar tracking mechanism and the power circuitry in a portable configuration, the housing enclosing the solar energy receiver, the solar tracking mechanism and the power circuitry within an interior of the housing in a closed configuration, the housing further including a carrying handle for carrying and movement of the portable solar energy generation system in the closed configuration.

2. The portable solar energy generation system of claim 1, wherein the power circuitry further comprises:
   a DC to DC voltage converter for generating a second DC voltage at a predetermined level, wherein the second DC voltage may comprise the at least one output voltage;
   a DC to AC voltage converter for generating a AC voltage at a predetermined level responsive to the second DC voltage, wherein the AC voltage may comprise the at least one output voltage; and
   a battery charger for generating a battery charging voltage responsive to the second DC voltage.

3. The portable solar energy generation system of claim 2, wherein the DC to DC voltage converter is configurable responsive to at least one control input to receive a selected DC voltage as the DC voltage and to provide the second DC voltage at a selected voltage level.

4. The portable solar energy generation system of claim 2, wherein the DC to AC voltage converter is configurable responsive to at least one control input to receive the second DC voltage at a selected voltage level and to output the AC voltage at a selected AC voltage level.

5. The portable solar energy generation system of claim 2, further comprising a battery subsystem for charging at least one battery and providing a selected battery voltage output level responsive to a selected input second voltage level, the battery voltage output level and the selected input second voltage configured responsive to at least one control input, wherein the battery subsystem further includes protection circuitry for protection against over voltage and overcurrent conditions within the at least one battery.

6. The portable solar energy generation system of claim 5, further comprising an adapter subsystem for providing a predetermined mechanical connector for outputting the selected battery output voltage level, the adapter subsystem connectable to the battery subsystem.

7. The portable solar energy generation system of claim 2, wherein each of the DC to DC voltage converter, the DC to AC voltage converter and the battery charger are removeably connected with each other, the system further including a removeably connectable base including wheels for transporting the system.

8. The portable solar energy generation system of claim 7, wherein the housing comprises a case for covering the DC to DC voltage converter, the DC to AC voltage converter and the battery charger, the case defining at least one opening for connectors or displays of the DC to DC voltage converter, the DC to AC voltage converter and the battery charger.

9. The portable solar energy generation system of claim 1, wherein the power circuitry further comprises at least one battery for providing the at least one charging voltage, the at least one battery charged by the power circuitry responsive to the DC voltage.

10. The portable solar energy generation system of claim 1 further including a controller for generating control signals to the solar tracking mechanism and the power circuitry.

11. The portable solar energy generation system of claim 1, wherein the solar energy receiver further includes a plurality of panels, each including at least one of the plurality of solar cells, the plurality of panels having a first configuration for storing the panels within the housing and a second configuration for presenting the panels in a position for tracking the sun.

12. The portable solar energy generation system of claim 11, wherein the plurality of panels move slideably between the first configuration and the second configuration.

13. The portable solar energy generation system of claim 11, wherein the plurality of panels move foldably between the first configuration and the second configuration.

14. The portable solar energy generation system of claim 11 further including:
   a first group of sensors for sensing light on a front face of the plurality of panels; and
   a second group of sensors for sensing light on a back face of the plurality of panels.

15. The portable solar energy generation system of claim 1, wherein the solar tracking mechanism further includes at least one drive mechanism from moving the solar energy receiver from a first position within the housing and a second position for tracking the sun.

16. The portable solar energy generation system of claim 1, wherein the solar tracking mechanism further comprises:
   a fixed base for supporting the solar tracking mechanism;
   a first rotating mechanism for rotating the solar energy receiver in an azimuthal direction; and
   a second rotating mechanism for rotating the solar energy receiver in an altitudinal direction.

17. The portable solar energy generation system of claim 1, wherein the solar energy receiver is configurable responsive to at least control input to receive a selected DC voltage as the DC voltage.

18. The portable solar energy generation system of claim 1, wherein the solar energy receiver further includes a plurality of panels, each including at least one of the plurality of solar cells, the plurality of panels having a first configuration for storing the panels within the housing and a second configuration for presenting the panels in a position for tracking the sun.

19. The portable solar energy generation system of claim 18, wherein the plurality of panels move slideably between the first configuration and the second configuration.

20. The portable solar energy generation system of claim 18, wherein the plurality of panels move foldably between the first configuration and the second configuration.

21. The portable solar energy generation system of claim 18 further including:
   a first group of sensors for sensing light on a front face of the plurality of panels; and
   a second group of sensors for sensing light on a back face of the plurality of panels.

22. The portable solar energy generation system of claim 1, wherein the solar tracking mechanism further includes at least one drive mechanism from moving the solar energy receiver from a first position within the housing and a second position for tracking the sun.

23. The portable solar energy generation system of claim 1, wherein the solar tracking mechanism further comprises:
   a fixed base for supporting the solar tracking mechanism;
   a first rotating mechanism for rotating the solar energy receiver in an azimuthal direction; and
   a second rotating mechanism for rotating the solar energy receiver in an altitudinal direction.

24. A portable solar energy generation system, comprising
   a solar energy receiver having a plurality of solar cells for converting solar energy into a DC voltage;
   a solar tracking mechanism enabling the solar energy receiver to continuously track a position of the sun with respect to the solar cells and to position the solar cells responsive thereto;
   a DC to DC voltage converter for generating a second DC voltage at a predetermined level, wherein the second DC voltage may comprise the at least one output voltage, wherein the DC to DC voltage converter is configurable responsive to at least one control input to receive a selected DC voltage as the DC voltage and to provide the second DC voltage at a selected voltage level;
   a DC to AC voltage converter for generating a AC voltage at a predetermined level responsive to the second DC voltage, wherein the AC voltage may comprise the at least one output voltage, wherein the DC to AC voltage converter is configurable responsive to at least one control input to receive the second DC voltage at a selected voltage level and to output the AC voltage at a selected AC voltage level;
   a battery charger for generating a battery charging voltage responsive to the second DC voltage, further comprising a battery subsystem for charging at least one battery and providing a selected battery voltage output level responsive to a selected input second voltage level, the battery voltage output level and the selected input second voltage configured responsive to at least one control input; and
   a housing containing each of the solar energy receiver, the solar tracking mechanism, the DC to DC voltage converter, the DC to AC voltage converter and the battery in a portable configuration, the housing enclosing the solar energy receiver, the solar tracking mechanism, the AC to DC voltage converter, the DC to AC voltage converter and the battery charger within an interior of the housing in a closed configuration, the housing further including a handle enabling carrying and movement of the portable solar energy generation system in the closed configuration.

25. The portable solar energy generation system of claim 24, wherein the battery subsystem further includes protection circuitry for protection against over voltage and overcurrent conditions within the at least one battery.

26. The portable solar energy generation system of claim 24, further comprising an adapter subsystem for providing a predetermined mechanical connector for outputting the selected battery output voltage level, the adapter subsystem connectable to the battery subsystem.

27. The portable solar energy generation system of claim 24 further including a controller for generating control signals to the solar tracking mechanism the DC to DC voltage converter, the DC to AC voltage converter and the battery charger.

* * * * *